(12) United States Patent
Suzuki

(10) Patent No.: US 6,794,419 B2
(45) Date of Patent: *Sep. 21, 2004

(54) METHOD FOR RECYCLING THE RESIN MOLD

(75) Inventor: Yasuhiro Suzuki, Suzuka (JP)

(73) Assignee: Suzuka Fuji Xerox Co., Ltd., Mie (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/463,098

(22) Filed: Jun. 17, 2003

(65) Prior Publication Data

US 2004/0014827 A1 Jan. 22, 2004

Related U.S. Application Data

(63) Continuation of application No. 09/950,388, filed on Sep. 10, 2001, now Pat. No. 6,610,758, which is a continuation of application No. PCT/JP00/01426, filed on Mar. 9, 2000.

(30) Foreign Application Priority Data

Mar. 10, 1999 (JP) .......................................... 11-064133
Aug. 12, 1999 (JP) .......................................... 11-228135

(51) Int. Cl.[7] .............................................. C08J 11/04

(52) U.S. Cl. ...................... 521/45.5; 521/40; 521/40.5; 521/41

(58) Field of Search ................................ 521/405, 913, 521/40, 40.5, 45.5, 46, 46.5, 47, 48

(56) References Cited

U.S. PATENT DOCUMENTS 6,610,758 B2 * 8/2003 Suzuki ....................... 521/40.5
6,664,303 B1 * 12/2003 Michael et al. ................ 521/41
2002/0062844 A1 * 5/2002 Imai et al. ..................... 134/18

FOREIGN PATENT DOCUMENTS

EP  0 761 763  * 12/1997  ......... C08L/101/00

* cited by examiner

Primary Examiner—Katarzyna Wyrozebski
(74) Attorney, Agent, or Firm—Cooper & Dunham LLP; Donald S. Dowden

(57) ABSTRACT

A method of recycling a molded resin consisting mainly of a thermoplastic resin which comprising adding as a recycle aid agent a rubber-like material (material) which is compatible with the thermoplastic resin as the main component of the molded resin, is moldable after having been mixed with the resin, and has the property of improving impact strength. By this method, impact strength and flame retardancy are recovered or improved.

1 Claim, 4 Drawing Sheets

Peeling and Breaking (Pigment in paint)

Peeling and Breaking (Pigment in resin)

×10,000  1 cm = 1 μm

Peeling and Breaking (Pigment in resin)

Thermoplastic elastomer

AS resin 2.5cm=2μm

Rubber part in ABS resin

METHOD FOR RECYCLING THE RESIN MOLD

CROSS REFERENCE TO RELATED APPLICATIONS

This is a continuation application under 37 CFR §1.53(b) of copending application Ser. No. 09/950,388, filed Sep. 10, 2001, now U.S. Pat. No. 6,610,758 which is a continuation of PCT/JP00/01426 filed Mar. 9, 2000, and designating the United States.

FIELD OF THE INVENTION

The present invention relates to a method for recycling the resin mold containing thermoplastic resin as a main component comprising mixing a rubber-like material in a thermoplastic resin which is the main component of a recycled resin mold as a recycle aid agent for recovery of the physical properties such as impact strength, non-flammability, and the like, wherein said rubber-like material has compatibility with said thermoplastic resin and has thermoplasticity so that said thermoplastic resin in which said rubber-like material is mixed can be molded

BACKGROUND OF THE INVENTION

Recycling the resin mold containing thermoplastic resin as a main component comprises collecting waste resin mold, washing and shattering said waste resin mold, pelletizing said shattered waste resin mold, and re-molding said resulting pellet. Said method for recycling the resin mold is called "material recycle" and during said process, said thermoplastic resin may be decomposed by heating in the pelletizing process, the re-mold process and the like. By heating repeatedly in said processes, molecular bond in said thermoplastic resin may be cut and the molecular weight of said thermoplastic resin may lower and in the case of the thermoplastic resin in which a rubber like component (rubber component, rubber like material, rubber like polymer, rubber like copolymer, graft copolymer) is added to improve the physical properties such as impact strength, elongation, and the like, said thermoplastic resin is such as ABS resin, HIPS resin, modified PPE resin and the like, said rubber component is oxidized and degradized (gellation) resulting in degradation of impact strength.

Further the flame-retardant and the like may be decomposed, liquefied, and vaporized or sublimated by heating and melting during the recycle process resulting on degradation of non-flammability of the thermoplastic resin.

Further many kinds of additives are combined in said thermoplastic resin and some of said additives have no compatibility with said thermoplastic resin. For instance, the pigment or the dyestuff such as titanium oxide, carbon black, iron oxide, and the like added for coloring of said thermoplastic resin, the inorganic material (inorganic filler) such as glass fiber (GF), glass beads (GB), carbon fiber (CF), talc, calcium carbonate, and the like added for increasing the rigidity of said thermoplastic resin have poor compatibility with said thermoplastic resin. When said materials are contained in said thermoplastic resin in a large amount, the physical properties of said thermoplastic resin may degrade by repeating recycling.

For instance, the waste resin mold collected may be assorted by each kind of resin and further each color of resin and then washed enough, shattered, adjusted color, and pelletized. In case where a desired amount of the virgin thermoplastic resin is added to said pelletized recycled thermoplastic resin to adjust color or the contained amount of impurities, further pigment or dyestuff may be added to said pelletized recycled thermoplastic resin or said virgin thermoplastic resin and as a result, the containined amount of said pigment or dyestuff in the blended resin of said recycled resin and said virgin resin increase resulting in degradation of impact strength.

In said material recycle system (WO9738838), it is described that said collected waste resin mold is shattered without assorting and pelletized and the resulting mold having a mixed color is coated with a paint containing a thermoplastic resin as a main component having compatibility with said resin of said mold to adjust color.

In the case of recycle of closed loop in which the recycle of said resin mold is performed repeatedly, the paint film coated on the surface of said resin mold melts and disperses in said thermoplastic resin which is the main component of said resin mold and dissolve in said thermoplastic resin since the main component of said paint film is a thermoplastic resin.

When said paint film melts and dissolves in said thermoplastic resin, the additives such as the pigment, the dyestuff and the like contained in said paint film disperses in said thermoplastic resin and as a result, the content of said pigment, dyestuff, and the like increases. Said pigment and dyestuff in said paint film have mostly poor compatibility with said thermoplastic resin, resulting in degradation of the physical properties such as impact strength, fluidity, and the like.

Content of the pigment and the dyestuff in the colored resin mold (virgin resin mold) is about 0 to 1.5% by weight while content of the pigment and the dyestuff in the dried colored paint film is about 30 to 70% by weight so that the pigment and the dyestuff content of said paint film is larger than that of said thermoplastic resin.

For instance, assuming that a paint film containing 60% by weight of the pigment and the dyestuff is formed on one side of a panel shaped mold whose thickness is 3 mm, the length and the width are 500 mm respectively. In a case where the virgin resin mold contains 0.3% by weight of the pigment and the dyestuff, the product of the weight of the virgin resin mold×the pigment and dyestuff content is 500 mm×500 mm×3 mm×1 (specific gravity)×0.3% by weight= 2.25×105 .

In the case of the dried paint film, the product is 500 mm×500 mm×0.015 mm (in the case of one side coating)×1 (specific gravity)×60 Wt%=2.25×105. As above described, in the case of recycle of the coated resin mold, the pigment and dye stuff content may become twice by as much as that of one time recycle and the pigment and the dyestuff content in said thermoplastic resin which is the main component of said resin mold increases as above described, resulting in the degradation of the physical properties of the recycled resin mold since said pigment and said dyestuff have poor compatibility with said thermoplastic resin respectively (compare Table 1 with Table 2).

A paint 0001 containing styrene modified acrylic resin having the compatibility with ABS resin of said resin mold (whose formulation is shown in Table 3) was coated on a resin mold produced by the injection mold of ABS resin (Styrac 191F, Asahi Kasei Corporation.) and said coated resin mold was shattered with the paint film and pelletized to re-mold. Physical properties after said process was repeated three times are shown in Table 1. As a comparison, said process consisting of shattering, pelletizing, and re-mold of said resin mold was repeated three times without coating said paint and the result was shown in Table 2.

Referring to Tables 1 and 2, it is recognized that IZOD impact strength of said recycled resin mold with paint coating degrades comparing with that of said recycled resin mold without paint coating. The reason why impact strength of said recycled resin mold degrades seems to be the effects of the pigment and the dyestuff in said paint film.

The physical properties degrade both in a case where said resin mold is coated with paint or in a case where said resin mold is not coated with paint. Said degradation of the physical properties seems to be caused by the degradation of the rubber component in ABS resin (AnSt-g-PBD).

In the case of the resin containing the same rubber component as the rubber component of ABS resin, such as HIPS, modified PPE, and the like, said rubber component degrades by repeated heating to melt, resulting in the degradation of impact strength of said thermoplastic resin (refer to Reference 3 and others).

As above described, the reasons of the degradation of impact strength by the repeated recycling process in the "material recycle" are as follows;

(1) In the case of the recycle of the coated resin mold, the pigment and the dyestuff in the paint film migrate in said thermoplastic resin which is the main component of said resin mold during the heating and melting process to increase the content of the pigment and dyestuff having poor compatibility with said thermoplastic resin which is the main component of said resin mold, resulting in the degradation of impact strength.

(2) Even in the case of the recycle of the uncoated resin mold the molecular weight of said organic thermoplastic resin which is the main component of said resin mold becomes lower by repeated heating and melting in recycle and when a rubber component is added in said thermoplastic resin to improve impact strength, said rubber component degrades by heating and oxidation, resulting in the degradation of impact strength.

The following methods for recovering the physical properties degraded by the recycle have been provided.

In Tokkaihei 5-4228, it is described that a recycle aid agent consisting of two or more kinds of polymer components having different properties but compatibility respectively is added to, one or more kinds of waste plastic wherein one polymer component disperses in the other polymer component in particle sizes between 0.0001 and 10 μm and each polymer component bonds chemically together to form a polyphase structure to recover impact resistance, bending elasticity, appearance and the like.

In Tokkaihei 5-92430, it is described that the coated automobile parts made of olefin resin is shattered and olefin resin, olefin elastomer and diene polymer having OH group at its end or hydrogenated diene polymer is blended in said shattered automobile parts to improve impact strength.

Nevertheless in this case it is feared that when the recycled resin mold is coated with a paint, the resulting paint film has poor adhesiveness with said recycled resin mold in a case where some kind of said material is added in the waste plastic.

In Tokkaihei 6-298991, it is described that material wherein rubber like polymer is copolymerized or graft copolymerized to said materials is added in the waste plastic for recycle. Nevertheless, in this case, it is feared that the resulting paint film has poor adhesiveness with the recycled resin mold in a case where some kinds of said material is added in the waste plastic.

In Tokkaihei 5-310987, it is described that a flame-retardant is added to the recycled polystyrene foam and that said flame-retardant includes bromine compound having compatibility with said polystyrene foam. In a case where only bromine compound is used as a flame-retardant, it is difficult to give sufficient non flammability to the recycled material and it is necessary to add another flame-retardant such as antimony oxide and the like.

Further it is possible to give non flammability to the plastic by adding phosphoric ester.

In Tokkaihei 7-290454, it is described that the non flammability of the recycled plastic is recovered by adding halogenated phosphoric ester, bromine compound, phosphoric ester and antimony oxide. Nevertheless there is no disclosure about ABS resin, modified PPE resin, PC/ABS resin and the like.

In Tokkaihei 8-245756, it is described that epoxydized diene polymer (partially hydrogenated ) is added in the recycled material to recover impact strength Nevertheless there is no disclosure about compatibility with said thermoplastic resin which is the main component of said resin mold and no disclosure about graft copolymerization or copomerization of monomer(s) constituting said thermoplastic resin which is the main component of said resin mold to give compatibility with said thermoplastic resin which is the main component of said resin mold.

Further, no data about the degradation of impact strength by recycle is indicated and repeated recycling is also not described, and there are no disclosure about the cause of the degradation of the physical properties of the resin mold by recycle in this publication.

Still further this publication illustrates the rubber components used to recover impact strength but only refers to adding a rubber component to recover impact strength according to detailed description and examples.

In Tokkaihei 7-228722, it is indicated that degraded impact strength is recovered by shattering said resin mold coated with a paint having no compatibility with polymer alloy, of a modified PPE resin and a polyamide resin, which is a thermoplastic resin as the main component of said resin mold, and adding a hydrogenerated styrenebutadiene block polymer in said shattered resin mold, and contaminating the paint film having no compatibility with the recycle. In this case it is feared that when said hydrogenated styrene butadiene block copolymer content increases, the paint film has poor adhesiveness.

Further there are no detailed description of the rubber component and no description of the flame retardant.

In Tokkaihei 10-204207, Tokkaihei 10-168357, Tokkaihei 10-168343 etc., there is description of adding the virgin material to the recycled material, but to recover the degraded physical properties by adding the virgin material, a lot of virgin material is necessary, and so this method is not economical and can not attain a high recycle ratio.

An object of the present invention is, in a method for recycling the resin mold comprising mainly of the thermoplastic resin, to solve the problems about degradations of impact strength and non-flammability and the recovery of impact strength and non-flammability without decreasing the adhesiveness of the paint film by adding the recycle aid agent.

DISCLOSURE OF THE INVENTION

Accordingly, the inventor paid attention to a technical idea of the present invention wherein a rubber-like material having compatibility with thermoplastic resin, which is the main component of a resin mold and so even if said rubber-like material is mixed in said thermoplastic resin, the resulting mixture can be molded. Said rubber-like material having properties to improve impact strength, is added as a recycle aid agent in said thermoplastic resin, and said non flammable material is added in said thermoplastic resin. Thus the inventor has attained the object of the present invention to recover impact strength and non flammability and maintain the sufficient adhesiveness of the paint film.

The present invention (the first invention according to claim 1) relates to a method for recycling the resin mold comprising mixing a rubber-like material in a thermoplastic resin which is a main component of a recycled resin mold as a recycle aid agent for recovery of the physical properties such as impact strength, non-flammability, and the like wherein said rubber-like material has compatibility with said thermoplastic resin and has thermoplasticity so that said thermoplastic resin in which said rubber-like material is mixed can be molded.

According to the invention (the second invention according to claim 2) of a method for recycling the resin mold, in the first invention, said rubber-like material has double bond(s) in molecular structure.

According to the invention (the third invention according to claim 3) of a method for recycling the resin mold, in the first invention, said rubber-like material has no double bond.

According to the invention (the fourth invention according to claim 4) of a method for recycling the resin mold, in the second invention, said double bond(s) exist(s) in the main chain of its monocular structure.

According to the invention (the fifth invention according to claim 5) of a method for recycling the resin mold, in the third invention, said double bond(s) exist(s) inside the chain(s) of its monocular structure.

According to the invention (the sixth invention according to claim 6) of a method for recycling the resin mold, in the fourth invention, said rubber-like material contains ethelyne-polybutadiene as a main component.

According to the invention (the seventh invention according to claim 7) of a method for recycling the resin mold, in the fifth invention, said rubber-like material contains ethelyne-propylene terpolymer as the main component.

According to the invention (the eighth invention according to claim 8) of a method for recycling the resin mold, in the third invention, said rubber-like material contains ethylene-propylene rubber or acrylic rubber.

According to the invention (the ninth invention according to claim 9) of a method for recycling the resin mold, in the first invention, said rubber-like material has the same or similar structure as said thermoplastic resin which is the main component of said recycled resin mold.

According to the invention (the tenth invention according to claim 10) of a method for recycling the resin mold, in the ninth invention, said thermoplastic resin which is the main component of said recycled resin mold is AS resin, AES resin, a polymer alloy or a polymer blend of said resins and the resin structure added to said rubber-like material consists of acrylonitrile(An) or styrene (St).

According to the invention (the eleventh invention according to claim 11) of a method for recycling the resin mold, in the ninth invention, said thermoplastic resin which is the main component of said recycled resin mold is PS resin, HIPS resin, PPE resin or a polymer alloy or a polymer blend of said resins and the resin structure added to said rubber-like material consists of styrene (St).

According to the invention (the twelfth invention according to claim 12) of a method for recycling the resin mold, in the tenth invention, said rubber-like material is a terpolymer in which acrylonitril(An) and styrene(St) are graft-copolymerized, more precisely said terpolymer is acrylnitrile and styrene graft copolymer containing a budadiene rubber(AnSt-g-PB, Anst-g-PBR,or AnSt-g-PB(D;R)).

According to the invention (the thirteenth invention according to claim 13) of a method for recycling the resin mold, in the tenth invention, said rubber-like material is a graft terpolymer in which acrylonitrile(An) and styrene(St) are graft copolymerized to an ethylene-propyrene-terpolymer, namely a graft terpolymer of acrylonitrile and styrene containing said ethylene-popyrene terpolymer (AnSt-g-EPDM).

According to the invention (the fourteenth invention according to claim 14) of a method for recycling the resin mold, in the tenth invention, said rubber-like material is a graft terpolymer in which acrylonitrile(An) and styrene(St) are graft-copolymerized to an ethylene-propyrene rubber, namely a graft terpolymer of acrylonitile and styrene containing said ethylene-propyrene terpolymer(AnSt-g-EPM).

According to the invention (the fifteenth invention according to claim 15) of a method for recycling the resin mold, in the tenth invention, said rubber-like material is a graft terpolymer in which acrylonitrile(An) and styrene(St) are graft-copolymerized to an acrylic rubber, namely a graft terpolymer of acrylonitrile and styrene containing said acrylic rubber(AnSt-g-ANM).

According to the invention (the sixteenth invention according to claim 16) of a method for recycling the resin mold, in the eleventh invention, said rubber-like material is a graft copolymer in which styrene (St) is graft polymerized to an acrylic rubber, namely a graft copolymer of styrene containing said acrylic rubber (St-g-ANM).

According to the invention (the seventeenth invention according to claim 17) of a method for recycling the resin mold, in the eleventh invention, said rubber-like material is a graft copolymer in which styrene (St) is graft-polymerized to a polybutadiene, namely a graft coplymer of styrene containing polybutadiene (St-g-PB, St-g-PBR, or St-g-PB (D;R)).

According to the invention (the eighteenth invention according to claim 18) of a method for recycling the resin mold, in the eleventh invention, said rubber-like material is a graft copolymer in which styrene(St) is graft-polymerized to an ethylene-propylcne-terpolymer, namely a graft copolymer of styrene containing said ethylene-propylene terpolymer (St-g-EPDM).

According to the invention (the nineteenth invention according to claim 19) of a method for recycling the resin mold, in the eleventh invention, said rubber-like material is a graft-copolymer in which styrene (St) is graft-polymerixed to an ethylene-propylene rubber, namely a graft copolymer of styrene containing said ethylene rubber (St-g-EPM).

According to the invention (the twentieth invention according to claim 20) of a method for recycling the resin mold, in the first invention, said rubber-like material is produced by the emulsion polymerization or the solution polymerrzation.

According to the invention (the twenty-first invention according to claim 21) of a method for recycling the resin mold, in the twentieth invention, said rubber-like material produced by the emulsion polymerization or the solution polymerization contains more than 20% by weight of rubber component.

According to the invention (the twenty-second invention according to claim 22) of a method for recycling the resin mold, in the twentieth invention, grafting ration of said rubber-like material produced by the emulsion polymerization or the solution polymerization is more than 30% by weight.

According to the invention(the twenty-third invention according to claim 23) of a method for recycling the resin mold, in the first invention, particle size of said rubber-like material is 0.05 μm to 50 μm and the aspect ratio(length/width) is more than 0.1 in a case where said rubber-like material is dispersed in said thermoplastic resin of said recycled resin mold by melting.

According to the invention(the twenty-fourth invention according to claim 24) of a method for recycling the resin mold, in the first invention, the glass transition temperature (Tg) determined by scanning differential thermal analysis method is lower than 200° C.

According to the invention (the twenty-fifth invention according to claim 25) of a method for recycling the resin mold, in the first invention, said rubber-like material contains one or more elastic molecular structure in its molecular structure.

According to the invention (the twenty-sixth invention according to claim 26) of a method for recycling the resin mold, in the first invention, said rubber-like material is a single material or a mixture of two or more materials.

According to the invention (the twenty-seventh invention according to claim 27) of a method for recycling the resin mold, in the first and the twenty-sixth inventions, said rubber-like material is a mixture of materials having different particle sizes respectively.

Said method for recycling the resin mold in claim 1 has an effect that the physical properties such as impact strength, elongation and the like can be recovered and improved since said rubber-like material having compatibility with a thermoplastic resin which is the main component of a recycled resin mold and so can be molded and being thermoplastic is added as a recycle aid agent.

Said method for recycling the resin mold in claim 2 has an effect that the degraded physical properties by recycling such as impact strength and elongation can be improved or recovered since said rubber-like material having double bond(s) in molecular structure and so having the rubber-like elasticity in claim 1 is added.

Said method for recycling the resin mold in claim 3 has an effect that the degraded physical properties by recycling such as impact strength and elongation can be recovered since said rubber-like material having no double bond but having the same rubber-like elasticity as the rubber-like material having double bond(s) in claim 1 is added.

Said method for recycling the resin mold in claim 4 has an effect that the adding amount of said rubber-like material can be reduced since said rubber-like material having double bond(s) in the main chain in claim 2 and so having large rubber-like elasticity is added as a recycle aid agent.

Said method for recycling the resin mold in claim 5 has an effect that the adding amount of said rubber-like material can be reduced since said rubber-like material which has double bond(s) in the side chain(s) in claim 3 and so degradation by repeated recycling is small is added as a recycle aid agent.

Said method for recycling the resin mold in claim 6 has an effect that the adding amount of said rubber-like material can be reduced since said rubber-like material containing polybutadiene as the main component in claim 4 and so having large rubber-like elasticity is added as a recycle aid agent.

Said method for recycling the resin mold in claim 7 has an effect that the adding amount of said rubber-like material can be reduced since said rubber-like material which contains ethylene-propyrene terpolymer as the main component in claim 5 and so the degradation of said rubber-like material in repeated recycling is small is added as a recycle aid agent.

Said method for recycling the resin mold in claim 8 has an effect that the degraded physical properties by recycling such as impact strength, elongation, and the like can be recovered since said rubber-like material containing ethylene-propylene rubber or acrylic rubber as the main component in claim 3, and so having rubber-like elasticity the same as said rubber-like material having double bond(s) is added.

Said method for recycling the resin mold in claim 9 has effects that the degraded physical properties by recycling such as impact strength, elongation and the like can be recovered and the problem of degradation of adhesiveness of the paint film can be solved since said rubber-like material having the same or similar structure as said main component of said recycled resin mold in claim 1 and so having compatibility with said resin mold and the thermoplastic resin which is the main component of the paint film is added as a recycle aid agent.

Said method for recycling the resin mold in claim 10 has effects that the problem of the degradation of adhesiveness of the paint film can be solved and the degraded physical properties by recycling such as impact strength, elongation and the like can be recovered since said thermoplastic resin of said resin mold is AS resin, ABS resin, or a polymer alloy or a polymer blend of said resins and said rubber-like material having a resin structure consisting of acrylonitrile (An) and styrene (St) is added in claim 9.

Said method for recycling the resin mold in claim 11 has an effect that the degraded impact strength by recycling can be recovered since said thermoplastic resin of said resin mold is PS resin, HIPS resin, PPE resin, or polymer alloy or polymer blend of said resins and said rubber-like material having a resin structure consisting of styrene (St) and so being thermoplastic and further having compatibility with said thermoplastic resin of said resin mold is added to dissolve in said thermoplastic resin to form the sea-island structure and the like in claim 9.

Said method for recycling the resin mold in claim 12 has effects that the problem of degradation of adhesiveness of the paint film when the paint is coated on said resin mold and the problem of degradation of physical properties by adding the recycle aid agent can be solved and the degraded physical properties by recycling, such as impact strength, elongation, and the like can be recovered since said rubber-like material is a terpolymer wherein acrylonitrile (An) and styrene (St) are graft-copolymerized (AnSt-g-PB, AnSt-g-PBR or AnSt-g-PB (D;R)) and so has compatibility with said thermoplastic resin of said resin mold in claim 10.

Said method for recycling the resin mold in claim 13 has an effect that the degraded impact strength by recycling can be recovered since said rubber-like material is said terpolymer (AnSt-g-EPDM) having thermoplasticity and when said rubber-like material is blended to repelletize and blended in the recycled resin mold without repelletizing and melted by heating to re-mold, said rubber-like material dissolves in said thermoplastic resin of said resin mold to disperse finely to form the sea-island structure and the like and further said rubber-like material has no double bond or has double bond(s) inside chain of its molecular structure in claim 10.

Further said method in claim 13 has another effect that recycle can be repeated since said rubber-like material has oxidation resistance.

Still further, said method in claim 13 has further economical effect that adding amount can be reduced since said rubber-like material has oxidation resistance against heating and melting in repeated recycling.

Said method for recycling the resin mold in claim 14 has an effect that the degraded impact strength by recycling can be recovered since said rubber-like material is said graft terpolymer (AnSt-g-EPM) having oxidation resistance during the heating process in recycle in claim 10.

Said method for recycling the resin mold in claim 15 has an effect that the degraded physical properties by recycling such as impact strength, elongation, and the like can be recovered since said rubber-like material is said graft ter-polymer (AnSt-g-ANM) in claim 10 and has the same rubber-like elasticity as the rubber-like material having double bond(s).

Said method for recycling the resin mold in claim 16 has an effect that the degraded physical properties by recycling such as impact strength, elongation, and the like can be recovered since said rubber-like material is said graft copolymer (St-g-ANM) having the same rubber-like elasticity as the rubber-like material having double bond(s) in claim 11.

Said method for recycling the resin mold in claim 17 has an effect that the degraded impact strength by recycling can be recovered since said rubber-like material is said graft copolymer (AnSt-g-PB, AnSt-g-PBR, or AnSt-g-PB (D;R)) having thermoplasticity and compatibility with said thermoplastic resin of said resin mold in claim 11 and form the sea-island structure and the like when said rubber-like structure is melted by heating together with said thermoplastic resin to dissolve in said thermoplastic resin.

Said method for recycling the resin mold in claim 18 has an effect that the degraded impact strength by recycling can be recovered since said rubber-like material is said graft copolymer (St-g-EPDM) having thermoplasticity and compatibility with said thermoplastic resin of said resin mold in claim 11, so that when said rubber-like material is blended in said shattered resin mold to re-pelletize or blended in said shattered resin mold without re-pelletizing and heated to melt for re-molding said rubber-like material together with said thermoplastic resin of said resin mold to disperse finely in said thermoplastic resin to form the sea-island structure and the like and said rubber-like material has no double bond or has double bond(s) inside chain of its molecular structure resulting in the oxidation resistance against the heating process in recycling.

Said method for recycling the resin mold in claim 19 has an effect that the degraded impact strength by recycling can be recovered since said rubber-like material is said graft copolymer (St-g-EPM) in claim 11 having oxidation resistance against the heating and melting process in recycling.

Said method for recycling the resin mold in claim 20 has effects that the adding amount of said rubber-like material can be economically reduced and the degraded impact strength can be recovered since said rubber-like material is produced by emulsion polymerization or solution polymerization or slurry polymerization in claim 1 and has a large content of the rubber component.

Said method for recycling the resin mold in claim 1 has effects that the adding amount of said rubber-like material can be economically reduced and the degraded impact strength can certainly be recovered since the content of the rubber component in said rubber-like material produced by emulsion polymerization or solution-polymerization in claim 20is more than 20% by weight.

Said method for recycling the resin mold in claim 22 has effects that compatibility of said rubber-like material with said thermoplastic resin of said resin mold is much improved and degraded impact strength by recycling can certainly be recovered since the graft ratio of said rubber-like material produced by emulsion polymerization or solution polymerization in claim 20 is more than 30% by weight.

Said method for recycling the resin mold in claim 23 has effects that the appearance of said recycled resin mold is improved and the physical properties of said resin mold do not depend on the direction since the particle size of said rubber-like material dispersed in said thermoplastic resin of said resin mold by heating and melting is in the range between 0.05 µm~50 µm and aspect ratio (length/width) is more than 0.1 in claim 1 resulting in a high impact absorption property.

Said method for recycling the resin mold in claim 24 has an effect that said rubber-like material can be finely dispersed in said thermoplastic resin of said resin mold since said rubber-like material in claim 1 has a glass transition temperature (Tg) determined by scanning differential thermal analysis method lower than 200° C.

Said method for recycling the resin mold in claim 25 has effects that since said rubber-like material contains single or 2 or more kinds of molecular structure(s) having elasticity in claim 1, high impact strength can be obtained in a case where said rubber-like material contains two or more kinds of said molecular structures and desirable gloss of said resin mold can be guaranteed.

Said method for recycling the resin mold in claim 26 has effects that said rubber-like material in claim 1 is a single material or a mixture of two or more materials and in a case of said mixture, high impact strength can be guaranteed and said recycled resin mold has preferable gloss.

Said method for recycling the resin mold in claim 27 has effects that high impact strength can be guaranteed and said recycled resin mold has preferable gloss since said rubber-like structure in claim 26 is a mixture of materials having different particle size respectively.

PREFERRED EMBODIMENTS

Figure 1:
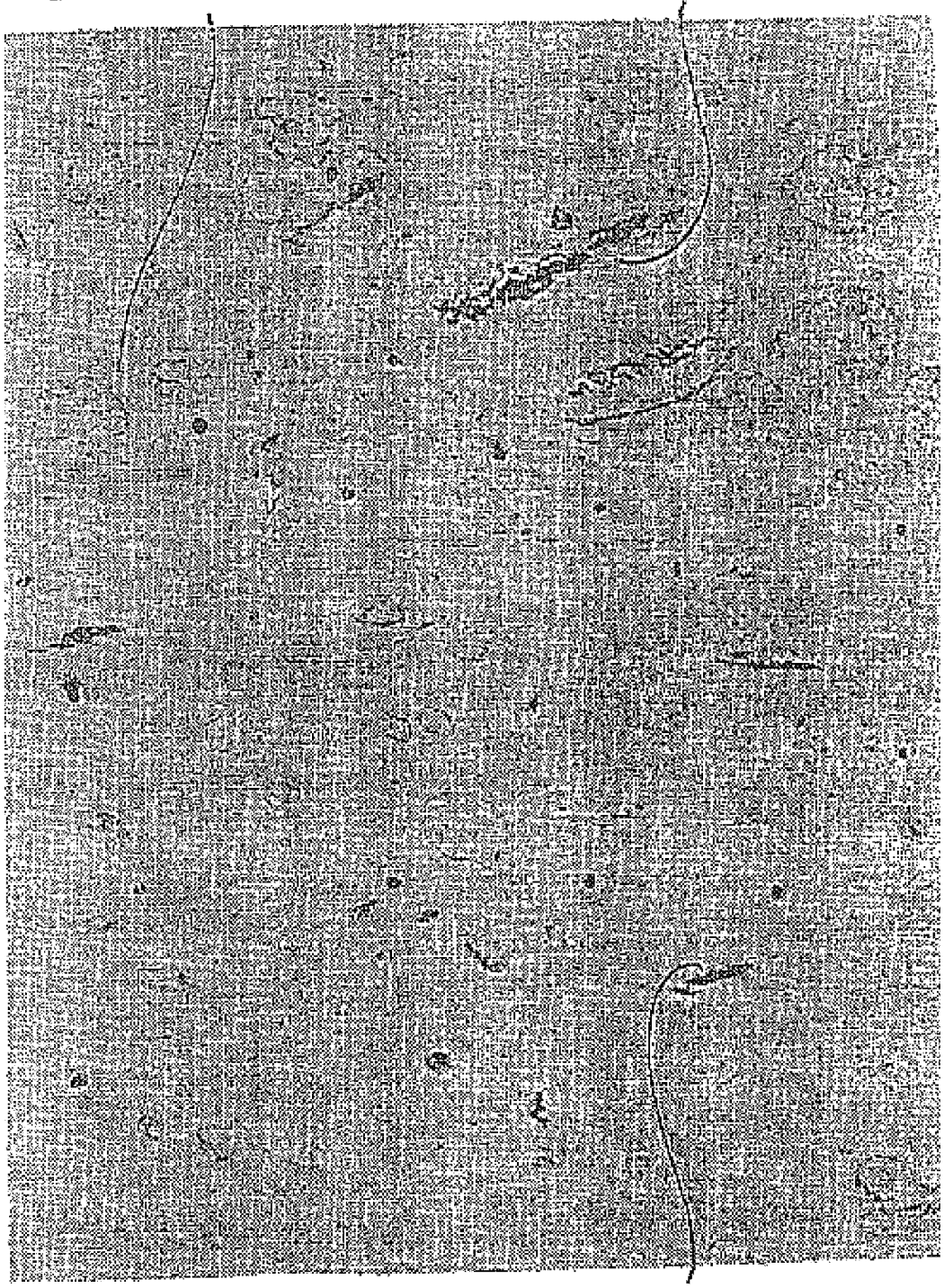
FIG. 1 is a TEM photograph showing a state of pigment and dyestuff mixed in said thermoplastic resin of said resin mold of the reference 2.

Preferred embodiments of the present invention are described below.

Said embodiments relate to a method for recycling the resin mold.

The resin used in said embodiment is thermoplastic synthetic resin and thermoplastic natural resin. Many kinds of thermoplastic resins such as resins listed in WO97/38838 and thermoplastic resins on the market can be used in the present invention. Besides said thermoplastic resins, EPM-AS, EPDM-AS, EPM-EPDM-AS, EPM-PS, EPDM-PS, EPM-EPDM-PS, EPM-PPE, EPDM-PPE, EPM-EPDM-PPE, EPM-PS-PPE, EPDM-PS-PPE, EPM-EPDM-PS-PPE, ANM-AS, ANM-PS, ANM-PPE, ANM-PS-PPE and the like may be used in this invention.

Further PC blend polymers comprising PC and olefin rubber-like polymers or acrylic rubber-like polymers, may be used in this invention, wherein blend polymers consist of PC/EPM-AS, PC/EPDM-AS, PC/EPM-EPDM-AS, PC/EPM-AS, PC/EPDM-AS, PC/EPM-EPDM-PS, PC/EPM-PPE, PC/EPDM-PPE, PC/EPM-EPDM-PPE, PC/EPM-PS-PPE, PC/EPDM-PS-PPE, PC/EPM-EPDM-PS-PPE, PC/ANM-AS, PC/ANM-PS, PC/ANM-PPE, PC/ANM-PS-PPE.

Further other blend polymers containing other resins such as PA, PET, PBT, PPS, polyetherimide and the like instead of PC may be used in this invention.

In addition, a polymer alloy comprising the resins mentioned above and hydrophilic polymer (e.g. poly ether ester amide (PEEA) and the like), may be used in this invention, wherein hydrophilic polymers afford electrostatic effect to the resins mentioned above.

In the same case, the compatibility aid agent is necessary to prepare a polymer alloy of said PC resin but to prepare polymer bend of PC resin and EPM-AS of EPDM-AS said compatibility aid agent is not always necessary. Many other blend polymers are now produced and marketed and will further be developed in future.

In the case of said rubber-like material wherein An and/or St is graft polymerized or graft copolymerized to a rubber, a resin containing AS, PS, PPE, and PE as the main component has compatibility with said rubber-like material.

The resin used for molding also may include "compound" in which inorganic material or organic material is mixed to improve chemical properties and physical properties besides above described blend polymers.

For instance, inorganic materials or organic materials are used as "fillers" to reduce cost or used as "reinforcing agent" to improve strength, or used as "reinforcing agent" to improve heat distortion temperature, brittleness temperature, vicat softening temperature, melting point, and mechanical properties such as tensile breaking strength (elongation), tensile yield point strength (elongation), bending strength, bending elasticity, impact strength, and the like.

A typical reinforcing agent is such as glass fiber, carbon fiber, or above described rubber-like material.

The agent to give the resin non-flammability is a flame-retardant or a flame-retardant aid agent and the typical flame-retardants are listed in WO97/38838 or other literatures.

Further the agent which is combined in the resin to give flexibility, elasticity, processability, and the like is called "plasticizer" and the material which is combined in the resin to give color is called "colorant". The colorant used to adjust the color of the recycled material to the original color or to give another color to the recycled material can be used as a kind of recycle aid agent.

"The recycle aid agent" is an agent that when the resin or the component in the resin is degraded by light, heating in the molding process, the re-molding process, the shattering process, the pelletizing process and the like in recycling or degraded by the solvent, and the like which are contained in the paint in a case where said resin mold is coated with the paint film containing the same type of resin as said resin of said resin mold or the different type of resin from said resin of said resin mold having compatibility with said resin of said resin mold and shattered without separating said paint film from said resin mold and recycled with or without pelletizing in recycling or the resin is degraded by migration of the pigment or the dyestuff of the paint to said resin in recycling, or the resin is degraded by being contaminated by the resin of the paint film in a case where the resin mold is coated with the paint film containing the different type of resin from said resin of said resin mold having no compatibility with said resin of said resin mold and shattered without separating said paint film from said resin mold in recycling, said recycle aid agent is used to recover the degraded mechanical propertied such as tensile strength, elongation, impact strength, and the like, the degraded thermal properties such as heat distortion temperature, softening temperature, fluidity, and the like, the degraded electrical properties such as dielectric constant, the degraded non flammability, and the like, said additives for the resin is used to improve the properties of the resin so that said additives may include the broad recycle aid agent.

Said recycle aid agent may include thermoplastic or thermosetting rubber, thermoplastic elastomer HYPE) and the like which have compatibility with said thermoplastic resin of said resin-mold and recover degraded impact strength, tensile strength and the like by recycling.

In the present invention, rubber component, rubber-like material, rubber-like elastic material, rubber-like polymer, rubber-like copolymer, graft copolymer containing rubber and the like which are added to recover the physical properties such as impact strength, elongation are summarizingly called "rubber-like material".

The necessary properties of said rubber-like material used to recover degraded impact strength of the resin by recycling are as follows.

(1) Rubber-like elastic material having thermoplasticity which can be melted together with said thermoplastic resin of said resin mold in the heating and melting and mixing process in the extruder to prepare virgin pellet, in the repelletizing process for recycling, in the re-molding process, and the like.

(2) Having compatibility with said thermoplastic resin of said resin mold and the resin contained in the paint film in a case where said resin mold is recycled with the paint film.

(3) Melting by heating in the pelletizing process and the molding process to finely disperse in said thermoplastic resin of said resin mold.

(4) A high content of rubber component to be able to recover the degraded physical properties in a little amount of said recycle aid agent to reduce economically adding amount of said recycle aid agent.

(5) Having oxidizing resistance and thermal stability in the heating and melting process to reduce adding amount of said agent in repeated recycling.

To give above described properties such as thermoplasticity and compatibility to said agent, graft copolymer in which monomer constituting said thermoplastic resin of said resin mold is graft polymerized to rubber, and is graft polymerized to rubber, block or random copolymer of said monomer and monomer constituting said rubber are provided.

Further rubber-like elastic material in which monomer constituting said thermoplastic resin of said resin mold is further graft polymerized to said graft rubber and said block or random copolymer are provided.

Still further said rubber may be singly used or two or more kinds of rubber may be used.

To possess rubber-like elasticity, the structure should have double bond(s) or the folding molecular structure in the case of the structure having double bond(s). There are three kinds of structure, the structure having double bond(s) in the main chain such as polybutadiene (butadicne rubber), the structure having double bond(s) in the side chain such as ethylene-propylene terpolymer and the structure having no double bond such as sthylene-propyrene rubber, acrylic rubber, and the like. The structure having double bond(s) in the main chain has poor oxidation resistance and it is necessary to add each turn when said structure is used as said agent. On the other hand, the structure having double bond(s) in the side chain or no double bond or the structure being molecular-designed to protect against oxygen attack such as chloroprene rubber has oxidation resistance in the heating and melting process in recycling and adding amount of said agent for each turn can be reduced comparing with said rubber such as polybutadiene.

Above described rubber-like material may include rubber-like material containing EPDM, EPM, ANM as the main component, such as AnSt-g-EPDM, AnSt-g-EPM, AnSt-g-ANM—aid rubber-like materials contain An and St and so have compatibility with ABS resin, AES resin, ASA resin, ACS resin and the like containing AS resin as the main component and St-g-EPDM, St-g-EPM, St-g-ANM—said rubber-like materials contain St and so have compatibility with HIPS resin, modified PPE resin and the like containing PS resin as the main component.

The resin compound in which rubber having excellent thermal stability such as EPDM, ANM, and the like is contained as the main component such as EPDM-AS, EPDM-PS, EPDM-PPE, ANM-AS, ANM-PS, ANM-PPE, and the like has little degradation of rubber-like elasticity in the rubber-like material in repeated recycling so that said resin compound is suitable material for recycle.

The thermoplastic elaxtomer has two kinds, one has molecular structure having poor-oxidation resistance and the other has molecular structure having high oxidation resistance. It seems that said rubber-like material having double bond(s) in side chain has higher oxidation resistance than said rubber-like material having double bond(s) in the main chain.

When the thermoplastic elastomer having the molecular structure having high oxidation resistance is used as the recycle aid agent, adding amount of said elastomer can be reduced for each turn.

In a case where the thermosetting rubber-like elastic material is used to recover impact strength, said material is finely dispersed by shear stress by using the twin screw extruder or the kneader in the heating and melting process (repelletizing process) in recycling. In a case where said rubber-like material has poor compatibility with said thermoplastic resin of said resin mold, the below described compatibility aid agent is mixed in the heating and melting and mixing process.

As above described, in a case where said recycle aid agent has no compatibility, it is preferable to use the compatibility aid agent to give compatibility.

First the rubber material constituting said rubber-like material of the present invention is illustrated. The rubber-like material contains a rubber material in the molecular structure. Said rubber material may be such as natural rubber (NR), styrene-butadiene rubber (SBR), butadiene rubbers (butadiene rubber, poly butadiene (PB, PBD, PBR)), acrylonitrile -butadiene rubber (NBR), hydrogenated nitrile rubber, cis-polybutadiene, (high cis-butadiene rubber, low cis-butadiene rubber), nitrile rubber, syndiotactic 1,2-polybutadiene, isoprene rubber (IR), cis-polyisoprene rubber, chloroprene rubber (CR), olein rubbers (e.g. ethylene-α-olefin rubbers; in the concrete, ethylene-propylene rubber (ethylene-propylene copolymer, ethylene-propylene-methylene rubber (EPM)), ethylene-propylene terpolymer (ethylene-propylene-diene terpolymer, ethylene-propylene-dienemethylene rubber(EPDM)), ethylene-butene copolymer(EBM), ethylene-butene—diene terpolymner, ethylene-butene-dienemethylene rubber, ethylene-butene terpolymer(EBDM) and the like, propylene rubber, propylene oxide rubber, ethylene-acrylic rubber, acrylic rubbers (comprising ACM, AMN, butyl acrylate, copolymers comprising butylacrylate and butadiene and/or α-olefin type rubber), chlorinated polyethylene, chlorohydrin rubber, halogenated butyl rubber, butyl rubber (IIR), chloro sulfonated polyethylene (CSM), fluorinated rubbers (e.g. fluorinated vinylidene, fluorinated terpolymers such as FKM and the like, tetrafluoroethylene-propylene rubbers, tetrafluoroethylene-perfluoromethylvinylether rubbers (e.g. FFKM), fluorosilicone rubbers, fluorinated vinylidene-hexafluoropropylene, fluorinated vinylidene-tetrafluoropropylene, fluorinated vinyl idene-tetrafluoropropylene, fluorinated phosphazene rubber, epichlorohydrin rubber (polyether rubber), thiocol (polysulfide rubber), silicone rubber, silicone rubbers, urethane rubber (having alkyl group, phenylnaphthyl group), chlorinated polyethylene, chlorohydrin rubber, hydrogenated nitrile rubber, halogenated butyl rubber, ethylene-vinyl acetate polymer, polynorbornane, STR, CBR, IBR, IBBR, polyether rubber, chlorobutyl hydrogenated nitrile rubber, rubber product from fluorinated rubbers, ethylene-vinyl acetate copolymer, soft acrylic resin and the like, wherein ethylene-propylene terpolymer means copolymer consisting of ethylene-propylene copolymer polymerized with monomer such as ethylidene norbornene (ENB), dicyclopentadiene (DCP), 1,4-hexadiene, (1,4-HD), and the like as other components.

Since the rubber containing carbon-carbon double bond (s) in the main chain such as BR has poor ozone resistance, it is preferable to administer treatment to reduce the double bond concentration such as hydrogenation, copolymerization with monomer constituting other kinds of rubber such as olefin rubber, acrylic rubber, and the like, and in the case of epicholorohydrin rubber wherein ozone crack generates in a severe condition, it is preferable to copolymerize glycidye (meth) acrylate with epycholorohydrin (ECH) and ethylene oxide (EO) to improve ozone resistance.

Many kinds of rubbers have poor compatibility with said thermoplastic resin of said resin mold to which said rubber is predetermined to combine, so generally monomer unit(s) of said thermoplastic resin is (are) graft polymerized to give compatibility.

For instance, in a case where said thermoplastic resin is styrene group resin, a rubber-like material to which one or more kinds of styrene group monomer(s) or a mixture of one or more kinds of styrene group monomer(s) and other monomer(s) are graft-polymerized or graft copolymerized such as a rubber-like material in which An and/or St is (are) graft-polymerized to a rubber such as PB, acrylic rubber, EPM, EBM, EPDM, EBDM, and the like, α-olefine rubber such as EPM, EBM, EPPM, EBPM, and the like are used to combine said thermoplastic resin. Especially, a rubber-like material in which An and/or St is (are) graft-polymerized to α-olefine rubber or acrylic rubber such as AuSt-g-EPM, AuSt-g-EPDM, St-g-EPM, St-g-EPDM have high thermal stability and little degradation of rubber-like elasticity when said rubbers or rubber-like materials arc exposed to a high temperature for a long time in repeated recycling and so-said rubbers or rubber-like materials are excellent as recycle aid agents.

Said rubbers having as excellent ozone resistance can be used.

Some rubbers have excellent ozone resistance as above described and said rubbers include saturated hydrocarbon type having no double bond in the main chain such as ethylene rubber, acrylic rubber, and the like, the rubber molecular-designed so as to protect against ozone attack (for instance cubic-design) such as epichlorohydrin rubber, chloroprene rubber, and the like and desirable rubber for recycle aid agent is a rubber having high ozone resistance.

When said rubber is used to recover the degraded impact strength of recycled material, said rubber has oxidation resistance against heating and melting in repeated recycling so that the degradation of impact strength is small.

The inventor found that when the rubber-like material containing EPDM, EPM, or acrylic rubber as the main component is combined the degradation of impact strength is small by determining impact strength after heating and melting the resins in which said rubbers are combined.

It is supposed that the difference of loss ratio of rubber-like elasticity is produced depending on the differences of said third component in the case of EPDM.

The rubber having poor ozone resistance can also be used as a recycle aid agent but rubber is partially oxidized and degraded to lose rubber-like elasticity by the heating and melting process in repeated recycling resulting in the degradation of impact strength of said recycled material so that the rubber component as the recycle aid agent should be supplied to recover impact strength in each recycle process and a butadiene rubber is one of the preferable rubber to recover impact strength, not economical though.

Acrylic rubber and α-olefin group rubber which are the rubbers having excellent thermal stability are illustrated below. Acrylic rubber and α-olefine group rubber are the rubbers having excellent thermal stability since acrylic rubber and α-olefine group rubber have no double bond in their molecular structures or have double bond(s) inside chain.

Acrylic rubbers (e.g. poly acrylate rubber, acrylic type rubber), which contain alkyl acrylate (CH2=CHCOOR) mainly, are alkyl acrylate homopolymer and copolymers polymerized with monomer having an active group to form a crosslinking point.

As acrylic rubbers, copolymer consisting of ethyl acrylate (EA) and 2-chloro ethyl vinyl ether, copolymer consisting of butyl acrylate (BA) and acrylonitrile (AN), copolymer consisting of butyl acrylate (BA) and-butadiene, copolymer consisting of EA and EB, copolymer consisting of EA, BA and methoxyetyhyacrylate (MEA), copolymer consisting of MEA and BA, copolymer consisting of EA and ethoxy ethylacrylate (EEA), copolymer consisting of EA, BA and MEA, copolymer consisting of BA, MEA and An, copolymer consisting of Ethylene and MA, alkyl acrylate containing the alkyl group having a polar group, acryl rubber containing alkoxy acrylate, acryl rubber containing alkoxy thioalkyl acrylate, terpolymer consisting of BA, MEA and vinyl chloroacetare, copolymer consisting of BA, EA, MEA and vinyl chloroacetate and the like may be used.

Polyolefin rubbers, produced by polymerizing one or more kinds of α-olefin with catalysts such as radical catalysts, metal oxide catalyst, Ziegler-Natta catalyst, Kaminsky catalyst and the like, may be mixed.

The α-olefin mentioned having double bond at α position and having carbon atoms 2 to 8, consisting of liner or blanch olefin, cycloolefin, may be selected.

As α-olefin used to this invention, ethylene, 3-methyl-1-butene, 3-methyl-1-pentene, butene-1, hexane-1, pentene-1, octane-1, 4-methyl-1-pentene, 3,3-dimethyl-l-butene, 4,4-dimethyl-1-hexene, 5-methyl-1-hexene, allylcyclopentane, allylcyclohexane, 3-cyclohexyl-1-butene, vinylcyclopropane, vinylcyclohexane and the like may be used.

In addition, one or more kinds of other monomer which can be copolymerized with α-olefin may be copolymerized with α-olefin, wherein other monomer comprise α-β unsaturated organic acid such as acrylic acid, methacrylic acid, malcic acid, itaconic acid, methyl acrylate, ethyl acrylate, methyl methacrylate, maleic anhydride, aryl maleic imide, alkyl maleic imide and the like, derivatives thereof; vinyl ester such as vinyl acetate, vinyl butyrate and the like; aromatic vinyl compound such as styrene, methyl styrene and the like; vinyl silane such as vinyl trimethylmethoxysilane, γ-methacryloileoxipropyltrimethoxysilane and the like.

Ethylene-α-olefin copolymers, one of the olefin rubber-like polymers, may be copolymerized by using α-olefin having 3 to 12 carbon atoms such as propylene, butene-1, 4-methylpentene, hexene-1, octane-1 and the like.

Polymer consisting of one pr more kinds of said α-olefin, particularly consisting of ethylene and one or more kinds of other α-olefin, and consisting of ethylene and one or more kinds of other α-olefin copolymerized with non-conjugated diene compound may be used.

As non-conjugated compounds, dicyclopentadiene, trisycclopentadiene, 5-methyl-2,5-norbornadiene, 5-methylene-2-norbornene, 5-vinyl-2-norbornene, 5-ethylidene-2-norbornene, 5-isopropylidene-2-norbornene, 5-isopropenyl-2-norbornene, 5-(1-butenyl)-2-norbornene, 5-(2-propenyl)-2-norbornene, 5-(5-hexenyl)-2-norbornene, 4,7,8,9-tetrahydro-indene, isopropylidene tetrahydro-indene, cyclooctadiene, vinylcyclohexene, 1,5,9-cyclododecatoluene, 6-methyl-4,7,8,9-tetrahydroindene, 2,2'-dicyclopentenyl, trans-1,2-divinylcyclobutane, 1,4-hexadiene, 2-methyl-1,4-hexadiene, 1,6-octadiene, 1,7-octadiene, 1,8-nonadiene, 1,9-decadiene, 3,6-dimethyl-1,7-octadiene,4,5-dime thyl-1 ,7-octadiene, 1,4,7-octatriene, 5-methyl-1,8-nonadiene and the like may be used.

In these non-conjugated compounds, 5-ethylidene-2-norbornene (ENB) and the combination of ENB and dicyclopentadiene (DCP) are preferable particularly. Further DCP is more preferable.

When in the case of using mixed resin consisting of 5-ethylidene-2-norbornene as olefin rubber-like polymer, AS and PS, appearance of the resin would be good.

Used to this embodiment, the ratio of ethylene, α-olefin and non-conjugated diene compound added if necessary may be 0.2 to 0.8/0.2 to 0.8/0 to 0.1, more preferably, 0.2 to 0.7/0.25 to 0.75/0 to 0.05 as molar fraction, wherein said non-conjugated diene compound content is under 5% by weight. Also, Mooney viscosity of ethylene-α-olefin copolymers (rubbers) is within the range of 5 to 150, preferably 10 to 70. Ethyliene (E) content of EPM and EPDM may be the ratio of 50 to 95%, preferably 60 to 99% by weight. Propylene (P) content of EPM and EPDM may be within the ratio of 5 to 50%, preferably 10 to 35% by weight. In addition to copolymerizing ethylene and propylene as α-olefin, ethylene-butenc copolymer (EBM) containing butene-1 and ethylene-butene-diene terpolymer (EBDM) may be used. As EBDM third part, EBN, DCP, 1,4-HD may be used. Ethylene (E) content of EBDM and EPDM may be within the ratio of 50 to 95%, preferably 60 to 90% by weight. Propylene (P) content of EBM and EBDM may be within the ratio of 5 to 50%, preferably 10 to 35% by weight.

As styrene monomers, graft-copolymerized to afford solubility in styrene to rubbers such as ethylene-α-olefin copolymers, ANM, PB and the like, comprising α-alkylmonovinylidene aromatic monomer (e.g. α-methylstyrene, α-ethylstyrene, α-methylvinyltoluene, α-methyidialkylstyrene and the like), substituted alkylstyrene (e.g. o-, m-, p-vinyltoluene, o-ethylstyrene, p-ethylstylene, 2,4-dimethylstyrene, p-tert-butylstyrene and the like), substituted halogaL neted styrene (e.g. o-chlorostyrene, p-chlorostyrene, o-bromostyrene, 2,4-dichlorostyrene and the like), alkyl-, halogaL neted substituted styrene (e.g. 2-chloro-4-methylstyrene, 2,6-dichlorostyrene and the like), vinyinaphthalene, vinyl anthracene may be used, wherein said styrene monomer may be mixed to use.

An Alkyl group, having 1 to 4 carbon atom(s) in general, contains an isopropyl group and an isobutyl group.

Monovinylidene aromatic monomers or mixture thereof are preferable as said alkyi group.

As acrylonitrile monomers, acrylonitrile, methacrylonitrile, ethacrylonitrile, fumaronitrile and mixture thereof may be used.

As other monomer, generally acrylates such as methylmethacrylate, ethylmethacrylate and the like, maleimides such as N-phenylmaleimide, maleimide, N-methylmaieimide, N-ethylmaleimide, (p-bromophenyl) maleimide methacrylate, methylmethaclylate, cyclohexylmaleimide, maleic anhydride, unsaturated nitrile compounds such as methacrylonitrile and the like may be used, wherein other monomer could not be limited if it has an ability to be copolymerized with styrene and acrylonitrile.

Graft parts of said graft copolymer, having solubility in AS, PS, PPE (containing modified PPE and the like) resins, being indispensable for graft-copolymerizing with rubbers such as EPM, EPDM, EBM, EBDM, ANM, PB and so on, consist of aromatic vinyl compounds (i.e. styrene monomers) comprising styrene, aromatic vinyl compounds of α-alkylmonovinylidene (e.g. α-methylstyrene, α-ethylstyrene, vinyl toluene (e.g. α-methylvinyltoluene and so on), α-methyl dialkylstyrene and the like), substituted alkylstyrene such as para methyl styrene, o-, m-, and p-vinyl toluene, o-ethyl styrene, p-ethyl styrene, 2,4-dimethylstyrene, p-t-butyl styrene and so on, halogenated styrene such as o-chlorostyrene, p-chlorostyrene, p-bromostyrene, o-bromostyrenc, 2,4-dichiorostyrene, 2,4,5-tribromostyrene and the like, an alkyl group substituted styrene having an alkyl group and halogen such as 2-chloro-4-methyl styrene 2,6-dichlorostyrene and the like, vinyl naphthalene, vinyl-anthracene and the like, wherein said aromatic vinyl compounds may be used as one or more kinds.

Particularly styrene is the most preferable so that styrene may be used mainly in combination with said aromatic vinyl compounds except styrene.

An Alkyl group, which has 1 to 4 carbon(s) in general, includes an isopropyl or isobutyl group.

An aromatic monovinylidene monomer or mixture thereof is preferable.

As acrylonitrile monomers (i.e. vinyl cyanide monomers), acrylonitrile, methacrylonitrile, ethacrylonitrile, α-halogenated acrylonotrile, fumaronitrile and mixture thereof may be used, wherein acrylonitrile is preferable particularly for use.

Methacrylates the alkyl group of which has 1 to 4 carbon (s) may be used, wherein mathacrylate is preferable particularly for use.

As aromatic monovinyl compounds, styrene, styrene halide, vinyl toluene, α-methylstyrene, vinylnaphthalene and so on may be used, wherein styrene is preferable particularly for use.

As cyanic vinyl compounds, acrylonitrile, methacrylonitrile, α-halogenated acrylonotrle may be used, wherein acrylonitrile is preferable particularly for use.

It is preferable to use other vinyl compounds such as (meth)acylates, vinyl acetate, vinyl chloride and so on instead of a part of vinyl compounds such as an aromatic vinyl compound and a cyanic compound, wherein said (meth)acylates are most preferable.

Further one or more kinds of monomer(s) that can copolymerize with aromatic vinyl monomer may be used as rubber modified styrene resins as a need arises.

It is necessary that mentioned above olefin rubbers, ANM, PB and the like, added to said thermoplastic resins such as said styrene resins, PPE resins, PC blend polymers (PC/ABS, PC/AES, PCIASA, PC/HIPS, PC/EPM-AS, PCFEPDM-AS, PC/EPM-PS, PC/EPDM-PS etc), polyolefin rubbers and the-like, have solubility in said thermoplastic resins in order to be used as a recycle aid agent.

Since said olefin group rubber consists of the same or similar monomer as (to) polyolefin group resin, said olefin group rubber has compatibility with said polyolefin group resin but not with other kinds of thermoplastic resin. The same or similar monomer with (to) monomer or structure unit is graft-polymerized to said olefin group rubber to improve compatibility with said polyolefin group resin wherein graft polymerization means a polymerization method in which said monomer(s) is(are) polymerized by said oil-soluble initiator or water-soluble initiator and/or high energy rays such as ultraviolet rays, electron rays and the like under the existence of rubber such as said olefin group rubber, ANM, PB, and the like, and the general polymerization method such as block polymerization, suspension polymerization, solution polymerization, emulsion polymerization, slurry polymerization, and the like are employed in said graft polymerization. The resulting graft polymer has trunk of rubber such as an olefin group rubber, ANM, PB, and the like and branch of polymer chain of said monomer(s) and in some case, rubber such as olefin group rubber, ANM, PB and the like and/or polymer consisting of said monomer(s) is(are) microblended in said graft polymer. Graft polymer of olefin group rubber, ANM, and PB suitable to combine with said thermoplastic resin are illustrated below.

To combine with PS or HIPS, EPM-PS, EPDM-PS and the like, styrene and/or one or more other styrene group monomer(s) is (are) graft polymerized to olefin group rubber-like polymer (styrene graft or olefine group rubber-like polymer) or acrylic rubber polymer (styrene graft acrylic rubber-like polymer) or butadiene group rubber-like polymer (styrene graft butadiene group rubber-like polymer).

Since said styrene graft olefin group rubber-like polymer, styrene graft acrylic rubber-like polymer, and styrene graft butadienc group rubber-like polymer have polymer chain of styrene group monomer as branch having the substantially same solubility parameter as PS, said rubber-like polymer has excellent compatibility.

To combine with AS or ABS, EPM-AS, EPDM-AS, ANM-AS, and the like, styrene and/or one or more other styrene group monomer(s) and acrylonitrile and/or one or more other nitrile group monomer(s) are graft polymerized to olefin group rubber-like polymer (styrene-nitrile graft olefin group rubber-like polymer) or acrylic rubber-like polymer (styrene-nitrile acrylic rubber-like polymer) or butadiene group rubber-like polymer (styrene-nitrile butadiene group rubber-like polymer).

Besides said monomers, other monomer(s) which can be copolymerized with said monomer(s) may be graft-polymerized to olefin group rubber-like polymer, acrylic rubber-like polymer, and butadiene rubber-like polymer.

Since said styrene-nitrile graft olefin group rubber-like polymer, styrene-nitrile graft acrylic rubber-like polymer, and styrene-nitrile graft butadiene group rubber-like plymer have the polymer chain of styrene-nitirile copolymer as a branch having the substantially same solubility parameter as AS or ABS, said rubber-like polymers have excellent compatibility.

In said graft olefin group rubber-like polymer, said graft acrylic rubber-like polymer, and said graft butadiene group rubber-like polymer, one or more kinds of said rubber-like polymer(s) may be used and the content of said rubber-like polymer in said graft rubber-like polymer may be 5 to 80% by weight, desirably 10 to 50% by weight, and the content of monomer(s) graft (co) polymerized may be 95 to 20% by weight, desirably 90 to 25% by weight and in the case of styrene-nitrile graft rubber-like polymer, the content of styrene group monomer may be desirably 5 to 95% by weight and the content of nitrile group monomer may be desirably 95 to 5% by weight. In the above described range, said graft rubber-like polymer has compatibility and effects of recovering of physical properties of said thermoplastic resin and effect of improvement of recycling property, namely effect of prevention of the degradation of impact strength in recycling may be balanced.

Since said graft rubber-like polymer has core-shell structure in which the rubber component is core and graft part is shell, as long as graft rubber-like structure such as graft olefin group rubber-like polymer having a high graft ratio is combined with said thermoplastic resin, no problem such as the degradation of adhesiveness of paint film may take place.

Originally, olefin group rubber has low adhesiveness with the paint film and in a case where said graft olefin group rubber-like polymer having a low graft ratio is combined with said thermoplastic resin mold, said resin mold may possess undesirably poor adhesiveness with the paint film or ink film.

In the case of TPE, some kinds of TPE have compatibility with said thermoplastic resin but give poor adhesiveness with paint film or ink film to said resin mold.

The particle size of said graft rubber-like polymer is desirably 0.0(mixed completely in molecular level) to 18 μm (0.1 to 5 μm, forming sea-island structure, 5 to 18 μm, forming other structure) further the range of the particle size can expand to 0.001 to 100 μm. In this particle size range, said graft rubber-like polymer may possesses especially big effect of improvement of recycling property.

In a case where some kinds of graft rubber-like polymers having different particle sizes respectively arc used together, the degraded physical properties may be much improved so that adding amount of said rubber-like polymer may be reduced.

Further the reduced viscosity (72 sp/c) of toluene soluble component of said graft olefin group rubber-like polymer is desirably 0.30 to 1.00 g/dl, more desirably 0.50 to 0.80 g/dl. The reduced viscosity is a measure of molecular weight.

Said graft olefin group rubber-like polymer, said graft acrylic rubber-like polymer and said graft butadiene group rubber-like polymer may be produced by many kinds of methods and preferable methods may be emulsion polymerization, solution polymerization and slurry polymerization which can give a high content of rubber(s) wherein an uniform mixture of said rubber-like polymer and monomer(s) to which initiator, and if desirably a chain transfer agent is supplied to a continuous multistage bulk polymerization reactor and continuously polymerized with deairation. In the case said graft olefin group rubber-like material is produced by said bulk polymerization the control of the reduced viscosity (72 sp/c) can be carried out by polymerization temperature, kind and amount of initiator solvent and amount of the chain transfer agent. Further control of copolymer composition can be carried out by monomer composition. Further the control of particle size of said rubber-like materials can be carried out by a stirring revolution speed and a small particle size may be obtained by a high revolution speed and a large particle size may be obtained by a low revolution speed.

Said graft olefin rubber-like copolymers such as St-g-EPM, St-g-EPDM, St-g-EPM EPDM, AnSt-g-EPM, AnSt-g-EPDM, AnSt-g-EPM EPDM, St-g-EBM, St-g-EBDM, St-g-EBM EBDM, AnSt-g-EBM, AnSt-g-EBDM, AnSt-g-EBM EBDM and the like, graft acrylic rubber-like copolymers such as St-g-ANM, AnSt-g-ANM, and butadiene graft polymers such as St-g-PB, AnSt-g-PB, indicate good compatibility with styrene.

In the case of mixing their copolymer with styrene resins, they disperse slightly into said styrene type resin, form sea-island structure and/or other slightly dispersed structure, and are mixed stably without separation so that styrene resins, physical property of which is restored, improved to be recyclable.

In this embodiment, EPM-AS means a mixed resin comprising AS and AnSt-g-EPM, EPDM-AS means a mixed resin comprising AS and AnSt-g-EPDM, EPM-EPDM-AS means a mixed resin comprising AS, AnSt-g-EPM and AnSt-g-EPDM, ANM-PS means a mixed resin comprising AS and AnSt-g-ANM, EPM-PS means a mixed resin comprising PS and St-g-EPM, EPbM-PS means a mixed resin comprising PS and St-g-EPDM, EPM-EPDM-PS means a mixed resin comprising PS, St-g-EPM and St-g-EPDM, and ANM-PS means a mixed resin comprising PS and St-g-ANM.

As graft polymer combined with PPE group resin, styrene graft olefin group rubber-like polymer such as St-g-EPM, St-g-EPDM, St-g-EPM EPDM, St-g-EBM, St-g-EBDM, St-g-EBM EBDM, and the like in which St is graft-polymerized to give the compatibility with PPE group resin, styrene graft acrylic rubber-like polymer such as St-g-ANM and the like styrene graft butadiene group rubber-like polymer such as St-g-PB and the like are preferably selected. Said rubber-like polymers have a styrene polymer chain having similar solubility parameter to PPE and have good compatibility with PPE resin so that said graft olefin group rubber-like polymer is stably mixed in PPE resin without separation and said rubber-like polymers can be used as a recycle aid agent of said PPE resin.

In this embodiment, EPM-PPE means a mixed resin comprising PPE and graft olefin type rubber-like copolymer (St-g-EPM), EPDM-PPE means a mixed resin comprising PPE and St-g-EPDM, EPM-EPDM-PPE means a mixed resin comprising PPE, St-g-EPM and St-g-EPDM, EPM-PS-PPE means a mixed resin comprising PS and EPM-PPE, EPDM-PS-PPE means a mixed resin comprising PS and EPDM-PPE, EPM-EPDM-PS-PPE means a mixed resin comprising PS, St-g-EPM and St-g-EPDM, ANM-PPE means a mixed resin comprising PPE and St-g-ANM, ANM-PS-PPE means a mixed resin comprising PS and ANM-PPE.

Since many kinds of rubbers above described have poor compatibility with said thermoplastic resin of said resin mold, the same or similar molecular structure as said thermoplastic resin of said resin mold is graft copolymerized, block copolymerized, or random copolymerized to said rubbers to give compatibility with said thermoplastic resin of said resin mold. These copolymerizations correspond to degeneration.

As said rubber-like material has compatibility with said thermoplastic resin of said resin mold and has thermoplasticity, when said rubber-like material is mixed in shattered recycled material to pelletize or when said rubber-like material is mixed in shattered recycled material without pellelizng said rubber-like material may be finely dispersed in said thermoplastic resin of said recycled material in the heating and melting process for remolding.

Further since said degenerated rubber-like material shows plasticity, said rubber-like material can be pelletized by using the similar machine used for pelletizing said thermoplastic resin.

In a case where the thermosetting rubber is used as the recycle aid agent, the compatibility aid agent may be added to said thermosetting rubber to give compatibility when said thermosetting rubber has no compatibility with said thermoplastic resin of said resin mold or paint film.

In the case of the thermosetting rubber, it is difficult to disperse finely said thermosetting rubber in said thermoplastic resin of said resin mold in the melting and mixing process, it is preferable to mix a resin having high melt viscosity to increase shear stress to disperse finely.

Illustrating partially, Anst-g-Pb which is added in ABS resin to improve impact strength is produced by graft polymerizing An and St to butadiene group rubber to give the same resin structure as AS resin giving thermoplasticity and compatibility with AS resin which is the main component of ABS resin.

In the case of HIPS resin, modified PPE resin, PPE resin and the like, St-g-PB having thermoplasticity and having the same resin structure of PS resin which is the main component of HIPS resin has compatibility with PS resin, AnSt-g-EPM, AnSt-g-EPDM, AnSt-g-ANM, and the like in which An and St are graft copolymerized to α-olefin group rubber-like polymer such as EPM, EPDM and the like or ANM instead of butadiene group rubber have thermoplasticity by said modifying and further have compatibility with ABS resin, AS resin, or the like(such as ASA (AAS))resin, AES resin, ACS resin, polymer alloy containing ABS as main component, etc).

Similarly, St-g-EPDM, St-g-ANM, and the like in which St is graft polymerized to EPM and EPDM, and ANM have compatibility with HIPS resin, PS resin or the like, polymer alloy such as PC/HIPS resin, PC/PS resin and the like, modified PPE resin or the like, polymer alloy of PPE resin or the like such as modified PPE/PA, since said graft rubber-like materials have the same resin structures as said thermoplastic resin.

Especially, graft rubber-like material having EPM, EPDM, or ANM as the main component has thermoplasitcity and good thermostability respectively, and so said graft rubber-like materials are used as the most suitable recycle aid agents for said thermoplastic resin.

Said rubber-like materials have compatibility with said thermoplastic resin of said resin mold, and moreover have thermoplasticity so that when such rubber-like materials are mixed in shattered recycled materials to pelletize or without pelletizing for remolding or mixed in pelletized recycled materials said rubber-like materials melt together with said thermoplastic resins molded in the heating and melting process to disperse finely in said thermoplastic resins.

In above described rubber-like copolymer, rubber-like material using olefin group rubber (such as EPM, EPDM), ANM, and the like as the main component has an oxygen resistance agent in the heating and melting process.

As a result, resin material for mold in which said rubber-like material having good thermostability, such as resin material for mold consisting of AS resin and AnSt-g-EPM, AnSt-g-EPDM, or AnSt-g-ANM, resin material for mold consisting of PS resin and St-g-EPM, St-g-EPDM, or St-g-ANM, each rubber-like material has compatibility with PS resin, and the like has little degradation of impact strength by the heating and melting process of repeated recycling since said rubber-like polymer has good thermostability.

PPE resin denatured with said rubber-like polymer having good heat resistance or said thermoplastic resin combined with said rubber-like polymer having good heat resistance has high recycling property.

Said material in which said rubber-like material is combined such as EPM-PS, EPDM-PS, ANM-PS, EPM-AS, EPDM-AS, ANM-AS and the like is not only the material having high recycling property but high durability.

The inventor determined the IZOD impact strength of high impact polystyrene in which St-g-EPDM(ethylene about 75%, propylene about 20%, DCP about 5%, rubber content about 38% average particle size of rubber 1.0 $\mu$m, graft ratio of styrene about 35% rubber-like polymer 0002, and about 55% : rubber-like polymer 0003) are mixed in PS resin (Mitsubishi Monsant Co, GPPS) respectively at a weight ratio of rubber-like polymer 0002 or 0003/PS resin= 75:25 and the results are that impact strength of PS resin in which rubber-like polymer 0.002 (graft ratio is about 35%) is mixed was 3.5 kg-cm/cm while impact strength of PS resin in which rubber-like polymer 0.003 (graft ratio is about 55%) is mixed was 5.8 kg-cm/cm.

Said results show that the rubber-like polymer having a higher graft ratio of St has higher compatibility with PS resin.

Chlorinated polyethylene is ACS resin consisting of AS resin and chlorinated polyethylene is a material having elasticity and high oxidation resistance but it is feared that said chlorinated polyethylene may be decomposed in the heating and melting stage in the pelletizing process or molding process to produce chlorine gas and hydrochlorine gas which corrode the molding machine and mold.

Further as said chlorinated polyethylene contains chlorine, it is feared to produce dioxine when said ACS resin is incinerated (thermal recycle).

Further resin compound in which graft rubber-like material is mixed in thermoplastic resin is known (Tokkaisho 57-139140, p2, PPE resin, Tokkaihei 1-190741, p2, styrene resin, Tokkaihei 7-118518, p3, PPE resin).

Nevertheless there is no disclosure in this reference about the recycling method in which said rubber-like materials are mixed.

Many kinds of rubbers have plasticity and no compatibility with said thermoplastic resins but said rubbers get compatibility and thermoplasticity by graft polymerization of monomer(s) of said thermoplastic resins.

Thermoplastic elastomaer is produced by random or block copolymerizaition of monomer(s) of rubber and monomer(s) of said thermoplastic resin. Said thermoplastic elastomer also has properties that impact strength of recycled material can be recovered or improved. Said thermoplastic elastomer has a soft segment part having elasticity and a hard segment part having plasticity in its molecular structure and is molecular-designed so that the soft segment and/or hard segment has (have) compatibility with said thermoplastic resin of said resin mold. Said thermoplastic elastomer may include an urethane group, a styrene group, a vinyl group, an amide group, an ester group and the like and is illustrated in WO9738838 etc.

It is expected that many kinds of elastomer will be developed by selecting combination of the hard segment and the soft segment. It is feared that said thermoplastic elastomer degrades adhesiveness of paint film even if said thermoplastic elastomer has the same or similar molecular structure as (to) said thermoplastic resin of said resin mold to have compatibility with said thermoplastic resin, so that the properties of paint film should be estimated when said elastomer is used as a recycle aid agent.

EPDM (or EPM) to which An and St are copolymerized such as AnSt-g-EPDM, St-g-EPM, St-g-EPDM, St-g-EPM has good thermal stability and plasticity the same as rubber-like material such as AnSt-g-EPPM, St-g-EPDM and the like and so has compatibility with resin containing AS or PS resin as the main component and can be used as a recycle aid agent.

Other recycle aid agents to improve properties of resin may include an agent to improve low temperature resistance, brittleness, low-temperature moldability, secondary process ability, bending resistance and bending whitening property and improve impact strength, a surging proof agent to improve fluidity of melted resin, a fish-eye proof agent, an agent to improve long run property or to give brightness, a matting agent, an agent to give slipping property of a mold blocking proof agent, an agent to improve moldability of vacuum or pressure forming of sheet, processing aid for extrusion, calendaring, blow molding, injection molding to promote gelation to improve appearance of mold, a release agent to improve releasing from metal, a plate out proof agent, a dimension stabilizer, an agent to improve durability, fluidity of resin, tear strength and cracking proof, a vibration proof agent, a control agent of glass temperature of resin or softening temperature.

Still further HIPS or PPE resin used for modification of modified PPE, PC resin, PA resin, PET resin, PBT resin and the like are also recycle aid agents to improve impact strength and oil resistance.

In a case where the degradation of rigidity is recognized in the recycled material where said rubber-like material is added in said recycled material, the resin material having a high rigidity such as AS resin having high molecular weight for ABS resin and PS resin having a high molecular weight for HIPS resin are preferably added to balance physical properties.

The flame-retardant or the flame-retardation aid agent which is added into the resin losing non-flammability by decomposition evaporation sublimation, and the like of the flame retardant in repeated recycling is a kind of recycle aid agent to give non-flammability. Said thermoplastic resin mold is generally colored in many kinds of colors and so the pigment, the destuff, and the like to color the thermoplastic resin mold are also recycle aid agents as above described.

In a case where said-materials as a recycled aid agent have no compatibility with said thermoplastic resin of said resin mold or the thermoplastic resin of the paint film, the compatibility aid agent is added to give compatibility, For instance polybutadiene rubbers (PBR, PBP, PB) are useful material to give ASB resin and HIPS resin impact resistance but said polybutadiene rubber has poor compatibility with said resins so that a compatibility aid agent is added in said PBR, and said mixture is finely cut by the twin screw extruder to disperse finely in said thermoplastic resin for molding. Typical compatibility aid agents are listed in WO738838. As above described, said rubber-like material is effectively added in the resin material to recover impact strength of the recycle resin material but when said rubber-like material is added excessively, impact strength may be recovered while rigidity, bending or tensile strength may degrade.

In this case, as above described, it is necessary to design the balance of the physical properties by adding for example AS resin or ABS resin containing the small amount of said rubber-like material for ABS resin and PS resin, HIPS containing a small amount of said rubber-like material PPE resin and the like for HIPS resin or modified PPE resin.

Resins produced by resin makers may be pelletized with said additives and are put on the market as mold material.

Many kinds of pigments and dyestuffs added in said materials have no compatibility with said thermoplastic resin of said resin mold so that when the mold is colored by said pigment or dyestuff, the degradation of said mold may be larger comparing with the uncolored mold. Actually IZOD impact strength of the colored mold and the colored mold consisting of ABS resin (Asahi Kasei Corporation., Styrac 191) were determined at 23° C. by the method according to ASTM-D256 and results are that impact strength of the colored mold was 14.9 kg-cm/cm and impact strength of the uncolored mold was 17.6 kg-cn/cm.

Above described degradation of impact strength may be caused by poor compatibility between the pigment or dyestuff and the thermoplastic resin of the resin mold.

In a case where the resin materials such as ABS resin, HIPS resin, modified PPE resin, PP resin used for such as an automobile bumper and the like in which a rubber component is added and the like are molded, painted, shattered or shattered without painting, pelletizing and re-molding, and said process is repeated, said rubber-like materials combined in said resin molds may be decomposed or degraded by oxidation in the heating and melting stage to lose rubber-like elasticity as above described or described in REFERENCES. Especially, said degradation may be remarkable in the case of the rubber-like material having double bond(s) in the main chain of its molecular such as AuSt-g-PB and the like. On the other hand, the degradation may be small in the case of the rubber-like material having no double bond or double bond(s) in the side chain such as AnSt-g-EPDM, AnSt-g-ANM and the like as confirmed in REFERENCE 3.

St-g-ANM and the like containing saturated acrylic rubber having no double bond as the main component may possesses good oxidation, resistance and this was recognized by the thermal stability test of AnST-g-ANM in EXAMPLE 11.

It is clear that adding the rubber-like material having compatibility with the recycled resin material is useful to recover degraded impact strength by recycling and this recognized in below described EXAMPLE 1.

In the case of styrene group resin, the particle size of the added rubber-like material may be 0.001 $\mu$m. to 100 $\mu$m.

In the case where, the particle size of the added rubber-like material is smaller than 0.001 $\mu$m, the degradations of appearance and brightness may be small but recovering of impact strength can not be expected without increasing the adding amount of the rubber-like material.

In a case where the particle size of the added rubber-like material is larger than 100 $\mu$m, said rubber-like material may be omnipresent in said thermoplastic resin of said resin mold so that the resulting resin mold has parts having poor impact strength and tensile strength and parts having high impact strength and tensile strength and further it is feared that the fluidity of the melted resin in molding also may be lowers.

As above described, the particle size of said rubber-like material used to improve impact resistance and tensile strength-is preferably 0001 $\mu$m to 100 $\mu$m and considering moldability and appearance (gloss, gloss patches, production of weld, and the like), the particle size of said rubber-like material is more preferably 0.1 $\mu$m to 60 $\mu$m, further more preferably, 0.1 $\mu$m to 18 $\mu$m and most preferably 0.1 $\mu$m to 5 $\mu$m. In this particle size range, the highest recovery of impact strength and tensile strength can be obtained by the smallest adding amount. The particle size of said rubber-like material may be the same as the particle size of said rubber-like material which is added initially to the resin for molding.

Further in some cases, two or more kinds of said rubber-like materials having different particle sizes respectively are used or two or more different kinds of said rubber-like materials are used to recover the physical properties.

Still further, in some cases, a kind of thermoplastic elastomer is singly used or in other cases two or more kinds of thermoplastic elastomers are used together, said thermoplastic elastomer(s) has (have) compatibility(ies) with said thermoplastic resin of said resin mold. Further in some cases, said rubber-like material and said thermoplastic elastomer are used together.

The recycle aid agent has preferably compatibility with said recycled resin to which said recycle aid agent is expected to add, and a well-known method described in such as WO9738838 and the like is used to estimate compatibility. The inventor estimated the compatibility of said recycle aid agent with said resin for molding by following tests.

(1) The bending test (breaking test of plate shaped or cylinder shaped or strand shaped test piece molded by injection molding or extrusion molding).

(2) Checker test (said resins are mixed together and the mixture is molded to make test piece in the injection molding. The checker test is performed on each test piece by the method according to JIS K 5400 8.5.2.

(3) Estimation of compatibility by observation of the dispersing situation, the surface of each resin, and boundary region.

The pellet of the virgin thermoplastic resin of the resin mold and the recycle aid agent are mixed together in a fixed weight ratio, for instance, said thermoplastic resin/the recycle aid agent=90/10~10/90)and the resulting mixture is then pelletized by using the single screw extruder. The resulting pellet of said resin mixture is molded in a mold as a test piece. Checker test according to JIS K 5400 8.5.2 is performed by using said test piece and number of checkers peeled off is estimated. When this number is less than 10, it is estimated having compatibility.

Further thin slice of said pellet of said resin mixture is prepared by cutting using microtome and a thin slice test piece is dyed by ruthenium oxide ($RhO_4$) or osmium oxide. Said dyed test piece is observed about morphology and peeling in the interface or the boundary region. The sea-island structure or other structures described in WO97/38838 or mixed structure in which a plural number of structures are mixed are observed.

The most desirable shape of said rubber-like material particles in the dispersion system is sphere but the shape having the aspect ratio of (width/length) 1 to 0.1 can be used and even in the case of the aspect ratio of less than 0.1, the dispersion system can be used depending on parts but in a case where the aspect ratio is less than 0.1 and said particles are orientated toward the same direction, it is undesirable because the resulting mold has orientated strength and in this case it is desirable to give uniformity of orientated strength by laminating a plural number of the resin molds.

Desirable particle size of said dispersed rubber-like material is as above described and when a compound consisting of said thermoplastic resin and said rubber-like material is shattered and pelletized, said compound may be melted in the cylinder of the single screw extruder and dispersed finely by physical force and in a case where said rubber-like material is dispersed more finely, it is desirable to use the kneader or the double screw extruder having a high mixing effect.

The compatibility is defined as the situation where said thermoplastic-resin of said resin mold and said recycle aid agent are mixed together in a molecular level in the heating-melting stage. In the embodiment of the present invention, the molding method, the coating method and paint described in WO97/38838 can be applied.

Said recycle aid agent may be added as follows.

(1) Blending the said recycle aid agent in the shattered resin mold.

(2) Pelletizing by heating and melting the mixture of said shattered resin mold and said recycle aid agent.

(3) Blending said recycle aid agent in recycled pellet prepared by palletizing of said shattered resin mold by heating and melting by using the extruder.

(4) Re-pelletizing a mixture of recycled resin pellet and blended resin pellet in which recycle aid agent is blended in heating and melting by using the extruder.

(5) Blending said shattered resin mold and said recycle aid agent in the pellet prepared by adding said recycle aid agent in said re-pelletized mixture and pelletizing.

In case (1), the mixing machine such as a tumbler and the like is economically used to mix said recycle aid agent in said shattered resin mold, but in a case where said shattered resin mold and said recycle aid agent have different particle size respectively, it is feared that said shattered resin mold and said recycle aid agent are not sufficiently mixed together so that it is necessary to prepare said shattered resin mold having a small particle size.

In case (2), pellet having good quality in which said recycle aid agent is mixed uniformly in said resin mold is obtained.

In case (3), the mixing ratio of said recycle pellet and said recycle aid agent is arbitrarily adjusted and in a case where both are pellet type, uniform mixing is attained. Case (3) is useful for preparation of a small amount of recycled resin.

In case (4), an uniform pellet is obtained. When said blended pellet is molded in a case where the material which is hard to be dispersed because of insufficiency of melting in the heated cylinder of the molding machine exists in said blend pellet of the materials having different melting point respectively, such as in a case where PC resin pellet is combined in recycled ABS resin to recover impact strength, it is feared that the problem of surging rises and unmelted resin pellets remain in the resin mold. To prevent said problems, palletizing before molding is necessary.

In case (5), it is applied to improve recycled resin pellet in such a case as the flame retardant is mixed in the recycled resin pellet to give non flammability.

In a case where said recycle aid agent has a powder type or a bulk type, pelletizing before molding is preferable by using the extruder and the like. Further in a case where the plural kinds of said recycle aid agents are used together pelletizing before molding is preferable. For instance, said rubber-like material such as AnSt-g-PB, St-g-PB, AnSt-g-EPDM, St-g-EPDM and the like used to recover impact strength of ABS resin and HIPS resin is provided in a powder type. It is preferable to pelletize said powder by using the extruder.

In a case where organic halide is used as a flame retardant, it is necessary that antimony oxide is added together with said organic halide. Antimony oxide is originally white powder and handling with enough attention is necessary since antimony oxide is a powerful agent.

Accordingly, it is preferable to prepare a master batch by pelletizing antimony oxide together with said organic halide and the resin such as recycled resin, virgin resin, other resins, rubber-like polymer, and the like for easy handling.

To provide pellets of the master batch of said recycle aid agent and said shattered resin material, the single-screw-extruder, the multi-screw extruder, the kneader, the Banbury mixer, the supermixer, the roll, the Blavander plastgraph and the like are used to mix and the extruder and pelletizer are used.

EMBODIMENT 1

The method of recycling this embodiment uses said rubber-like material as said recycle aid agent containing polybutadiene (PB, PBR, PBD), butadiene group rubber (PBR), olefine group rubber such as ethylene propylene rubber (EPM, EPR) ethylene-propylene terpolymer (ethylene-propylene diene rubber, ethylene-propylene diene monomer, EPDM) and the like, acrylic rubber, and the like as the main component and two or more said rubbers may be used together.

Accordingly, said method of EMBODIMENT 1 relating to the invention of claim 1and has an effect that the degraded physical properties by recycling such as impact strength, tensile strength and the like can be improved or recovered.

EMBODIMENT 2

In the method for recycling this embodiment, said rubber-like material of EXAMPLE 1 as said recycle aid agent has double bond(s) in its molecular structure such as butadiene group rubber, ethylene propylene terpolymer.

Accordingly, said method of EMBODIMENT 2 has an effect that the degraded physical properties by recycling such as impact strength, tensile strength and the like can be improved or recovered since said rubber-like material having double bond in its molecular structure has rubber-like elasticity.

EMBODIMENT 3

In the method for recycling this embodiment, said rubber-like material of EMBODIMENT 1 as said recycle aid agent has no double bond, such as acrylic rubber, ethylene-propylene rubber, and the like.

Accordingly, said method of EMBODIMENT 3 has an effect that the degraded physical properties by recycling such as impact strength, tensile strength, and the like can be recovered.

EMBODIMENT 4

In the method for recycling this embodiment, said rubber-like material of EMBODIMENT 2 as said recycle aid agent has double bond(s) in the main chain in its molecular structure.

Accordingly, said method of EMBODIMENT 4 has an effect that adding amount of said recycle aid agent can be reduced.

EMBODIMENT 5

In the method for recycling this embodiment, said rubber-like material of EMBODIMENT 2 has double bond(s) in the side chain in its molecular structure such as ethylene propylene terpolymer and the like.

Accordingly, said method of EMBODIMENT 5 has an effect that adding amount of said rubber-like material as said recycle aid agent added in recycling can be reduced since said rubber-like material is little degraded in recycling.

EMBODIMENT 6

In the method for recycling this embodiment, said thermoplastic resin of said resin mold of EMBODIMENT 3 is AS resin, ABS resin, or polymer alloy or polymer blend containing these resins as the main component and said rubber-like materials of EMBODIMENT 3 as said recycle aid agents have compatibility with said thermoplastic resins of said resin molds.

Accordingly, said method of EMBODIMENT 6 has an effect that problems of degradation of physical properties by adding said recycle aid agent, degradation of adhesiveness of the paint film, and the like can be solved and the degraded physical properties by recycling such as impact strength, tensile strength can be recovered.

EMBODIMENT 7

In the method for recycling of this embodiment, said rubber-like material of EMBODIMENT 4 as said recycle aid agent is Aust-g-PB having compatibility with AS resin, ABS resin, or polymer alloy or polymer blend containing these resins as the main component.

Accordingly, said method of EMBODIMENT 7 has an effect that degraded impact strength by recycling can be recovered since said rubber-like material melt together with said thermoplastic resin to form sea-island structure or other structures.

EMBODIMENT 8

In the method for recycling of this embodiment, said rubber-like material of EMBODIMENT 6 as said recycle aid agent is AnSt-g-EPM or AnSt-g-EPDM having compatibility with AB resin, ABS resin, or polymer alloy or polymer blend containing these resin as the main component.

Accordingly, said method of EMBODIMENT 8 has an effect that degraded impact strength can be recovered since said rubber-like material has thermoplasticity and compatibility with said thermoplastic resin of said resin mold so that when said rubber-like material is blended in the shattered resin mold and re-pelletized for re-molding or re-molded without pelletizing, said rubber-like material melt together with said thermoplastic resin of said resin mold to disperse finely in said thermoplastic to form sea-island structure or other structures and dissolve together and further said rubber-like material has good oxidation resistance in the heating and melting stage in recycling since said rubber-like material has no double bond or has double bond(s) in side chain of said molecular structure.

Further said method of EMBODIMENT 8 has further effect that the adding amount of said rubber-like material can be economically reduced in repeated recycling since said rubber-like material has good oxidation resistance against repeated beating and melting.

EMBODIMENT 9

In the method for recycling this embodiment, said rubber-like material of EMBODIMENT 2 as said recycle aid agent is nitrile and styrene graft-copolymerized acrylic rubber (AnSt-g-ANM) having no double bond in its molecular structure.

Accordingly, said method of EMBODIMENT 9 has an effect that the degraded physical properties by recycling such as impact strength, tensile strength can be recovered since said rubber-like material having no double bond has rubber-like elasticity the same as said rubber-like material having double bond(s).

EMBODIMENT 10

In the method for recycling this embodiment, said thermoplastic resin of said resin mold of EMBODIMENT 5 is PS resin, HIPS resin or polymer alloy or polymer blend containing these resins as the main component and said rubber-like material of EMBODIMENT 5 has compatibility with said thermoplastic resin of said resin mold. Said rubber-like material has the same molecular structure as said thermoplastic resin by common polymerization to give compatibility with said thermoplastic resin.

Accordingly, said method of EMBODIMENT 10 has effects that degraded impact strength by recycling can be recovered and the problem of degradation of adhessiveness of the paint film in a case wherein said resin mold is painted is solved.

EMBODIMENT 11

In the method for recycling this embodiment, said rubber-like material as said recycle aid agent of EMBODIMENT 11 is St-g-PB having compatibility with PS resin, HIPS resin, or polymer alloy or polymer blend containing these resins as the main components.

Accordingly said method of EMBODIMENT 11 has an effect that degraded impact strength by recycling can be recovered since said rubber-like material St-g-PB melt together with said thermoplastic resin in the heating and melting stage in recycling to dissolve together to form sea-island structure or other structures.

EMBODIMENT 12

In the method for recycling this embodiment, said rubber-like material of EMBODIMENT 3 or 5 as said recycle aid agent is ST-g-EPM or ST-g-EPDM having compatibility with PS resin, HIPS resin, or polymer alloy of polymer blend containing these resins as the main component and having thermoplasticity.

Accordingly; said method of EMBODIMENT 12 has an effect that degraded impact strength by recycling can be recovered since said rubber-like material, St-g-EPM or ST-g-EPDM melt together with said thermoplastic resin of said resin mold in the heating and melting stage when said rubber-like material is blended in said shattered resin mold to re-pelletize or re-molded without pelletizing said rubber-like material dissolve together with said thermoplastic resin to disperse finely in said thermoplastic resin forming sea-island structure or other structures and said rubber-like material has no double bond or has double bond(s) in the side chain of its molecular structure and so has good oxidation resistance is obtained in the heating and melting stage in recycling.

Further said method has further effects that recycle can be repeatedly carried out and the adding amount can be economically reduced in repeated recycling since said rubber-like material has good oxidation resistance as above described.

EMBODIMENT 13

In the method for recycling this embodiment, said rubber-like material of EMBODIMENT 3 is styrene graft copolymerized acrylic rubber (ST-g-ANM) having no double bond in its molecular structure.

Accordingly said method of EMBODIMENT 13 has an effect that the degraded physical properties such as impact strength, tensile strength and the like can be recovered since said rubber-like material having no double bond has the same elasticity as rubber-like material having double bond(s).

EMBODIMENT 14

In the method for recycling this embodiment, said thermoplastic resin of said resin mold of EMBODIMENT 5 is PPE resin or polymer alloy or polymer blend containing said PPE resin as the main component and the like, and said recycle aid agent of EMBODIMENT 5 is said rubber-like material having compatibility with said thermoplastic resin.

Said rubber-like material has the same molecular structure as said thermoplastic resin of said resin mold by the known polymerization method such as solvent polymerization, slurry polymerization emulsion polymerization and the like.

To obtain a high graft ratio of said rubber-like material, the graft copolymerization of the graft copolymerized rubber-like polymer can be usefully applied.

When the graft ratio is increased, the compatibility of said rubber-like material is improved and said rubber-like material is easily dispersed in said thermoplastic resin.

The rubber-like material having a high graft ratio and the rubber-like material having a low graft ratio having the same rubber content and the same particle size are respectively used to recover impact strength of said thermoplastic resin. The result is that a higher recovery is obtained in the case of the rubber-like material having a high graft ratio than the rubber-like material having a low graft ratio.

The rubber-like material having a high rubber content may reduce economically the adding amount to recover degraded impact strength by recycling.

To produce the rubber-like polymer having a high rubber content, emulsion polymerization, slurry polymerization and the like are applied.

Accordingly, said method of EMBODIMENT 14 has effects that the degraded physical properties such as impact strength, tensile strength, and the like by recycling can be recovered by adding said recycle aid agent and the problem of degradation of adhesivenss of the paint film in a case where said resin mold is painted can be solved since said recycle aid agent has compatibility with the thermoplastic resin which is the main component of paint film.

EMBODIMENT 15

In the method for recycling this embodiment, said rubber-like material of EMBODIMENT 4 as said recycle aid agent is styrene graft copolymerized butadiene group rubber (ST-g-PB, St-g-PBR, or St-g-PB (D;R) to give compatibility with PPE resin, or polymer alloy or polymer blend containing these resin as the main component.

Accordingly said method of EMBODIMENT 15 has an effect that degraded impact strength by recycling can be recovered since said rubber-like material has compatibility with said thermoplastic resin of said resin mold and further thermoplasticity so that said rubber-like material melt and dissolve together with said thermoplastic resin in the heating and melting stage in recycling to form sea-island structure or other structures.

EMBODIMENT 16

In the method for recycling this embodiment, said rubber-like material of EMBODIMENT 4 as said recycle aid agent is St-g-PB having thermoplastcity and compatibility with said thermoplastic resin of said resin mold so that said rubber-like material melt and dissolve together with said thermoplastic resin to form sea-island structure or other structure.

Accordingly said method of EMBODIMENT 16 has an effect that degraded impact strength by recycling can be recovered.

EMBODIMENT 17

In the method for recycling this embodiment, said rubber-like material of EMBODIMNENT 5 is St-g-EPM or ST-g-EPDM having compatibility with PPE resin, or polymer alloy or polymer blend containing these resins.

Accordingly said method of EMBODIMENT 17 has an effect that degraded impact strength by recycling can be recovered since said rubber-like material has compatibility with said thermoplastic resin of said resin mold and thermoplasticity and when said rubber-like material is blended in the shattered resin mold and re-pelletized or said rubber-like material is blended in the shattered recycled resin mold without re-pelletizing to re-mold, said rubber-like material melt and dissolve together with said thermoplastic resin and disperse finely in said thermoplastic resin forming sea-island structure and other structures and further said rubber-like material has good oxidation resistance.

Further said method of EMBODIMENT 17 has another effect that recycling can be performed repeatedly.

Still further said method of EMBODIMENT 17 has further effect that the adding amount of said rubber-like material can be reduced economically since said rubber-like material has good oxidation resistance against heating and melting.

EMBODIMENT 18

In the method for recycling this embodiment, said rubber-like material of EMBODIMENT 3 as said recycle aid agent is styrene graft copolymerized acrylic rubber (St-g-ANM) having no double bond in its molecular structure.

Accordingly said method of EMBODIMENT 18 has an effect that the degraded physical properties such as impact strength, tensile strength, and the like by recycling can be recovered since said rubber-like material having no double bond has the same rubber-like elasticity as said rubber-like material having double bond(s).

EMBODIMENT 19

In the method for recycling this embodiment, said rubber-like material having compatibility with said resin of said resin mold and said rubber-like material has thermoplasticity and so moldability and can recover the physical properties such as impact strength, tensile strength, and the like. In this method said rubber-like material is added to the shattered resin mold coated with styrene modified acrylic resin or thermoplastic acrylic resin paint together with a flame retardant and a flame retardation aid agent if necessary, said mixture is heated and melted to pelletize, for recycling.

Accordingly said method of claim 19 has effect that the degraded impact strength of recycled resin mold with paint film by recycling can be recovered and improved and non flammability of said recycled resin mold can be recovered and improved.

EXAMPLES AND REFERENCES

EXAMPLES and REFERENCES of the present invention are described bellow.

REFERENCE 1

In REFERENCE 1, the cause of the degradation of IZOD impact strength of said resin mold with paint film was investigated. Paint samples 0001 (white) and 0002 (clear, sample in which pigment and dyestuff are removed from sample 0001, 0003 (sample in which the resin is removed) whose formulations are shown in Table 3, 4 and 5 were respectively coated on the surface (outside) of box type resin mold sample (length: 450 mm, width: 400 mm, height: 30 mm, thickness 3 mm). Thermoplastic resin of each paint sample was styrene modified acrylic resin and the thermoplastic resin of the resin mold was ABS resin (Asahi Kasei Corporation., Styrac 191H, natural color). Each resin mold sample was shattered with paint film and molded in strand by using the single screw extruder (OENU machinery Co, Type HEM75). After cooling, said strand was pelletized by the pelletizer (OENU machinery Type GTS 2).

Test pieces for IZOD impact strength ASTM-D468 were prepared by using said recycled pellet. The results are shown in Table 6. As a comparison, a test piece of virgin ABS resin was prepared by the same procedure as above described. The result of IZOD impact strength of this test piece is also shown in Table 6.

Referring to Table 6, it is proved that in a case where said resin mold sample was recycled without separating paint film, pigment and dyestuff in paint film effected degradation of impact strength.

In a case where clear paint was coated on said resin mold sample, it is proved that the thermoplastic resin of paint has little effect on degradation of impact strength. Further solvent of paint also has little effect on degradation of impact strength.

REFERENCE 2

In REFERENCE 2, whether pigment and dyestuff have compatibility with said thermoplastic resin of said resin mold or not was observed.

Modified PPE resin mold sample (XYRON 220Z) was coated with paint sample 0001 and then said resin mold was shattered and pelletized without separating a paint film. TEM photograph was taken to estimate whether the thermoplastic resin of the paint film has compatibility with the thermoplastic resin of the resin mold sample or not, whether the pigment and the dyestuff ($TiO_2$ etc.) have compatibility with the thermoplastic resin or the resin of paint film or not.

Referring to TEM photograph in FIG. 1, it is recognized that the thermoplastic resin of paint film (styrene modified acrylic resin) has compatibility with the thermoplastic resin of the resin mold sample (styrene modified polyphenylene ether resin, Asahi Kasei Corporation., XYRON N220Z in which rubber-like polymer AnSt-g-PBD is combined) since peeling or breaking in the interface or boundary region was not observed. On the other hand, it is recognized that pigment and dyestuff in paint have no compatibility with the thermoplastic resin since peeling or breaking in the interface or boundary region was observed.

Referring to the results of REFERENCES 1 and 2, it is proved that pigment and dyestuff of paint film having no compatibility contaminate recycled thermoplastic resin to degrade impact strength

REFERENCE 3

In REFERENCE 3, the cause of the degradation of the physical properties, especially impact strength of said thermoplastic resin in a case where recycle was repeated was investigated.

The method to find the cause was as follows. Said thermoplastic resin of said resin mold was heated and melted at 250° C in the cylinder of the extruder for a fixed time and then said melted thermoplastic resin was purged from said cylinder to form the purged mass. Said purged mass was soaked in the water to prevent oxidation and after enough soaking in the water, said purged mass was taken out from the water and dried and shattered by the crusher twice and the shattered purged mass was dried to prepare a powder sample.

A test piece was prepared from said powder sample the same as REFERENCE 1 and IZOD impact strength of said test piece was determined. The results are shown in Table 7, 8, 9, 10, 34, and 35.

Table 7 shows the result of ABS resin (Sumitomo Chemical Co., Ltd., Kralastic MVF-1KI, natural color) containing about 50% by weight of said rubber-like material 0001 (AnSt-g-PB, produced by emulsion polymerization, graft ratio about 40% by weight, An/St weight ratio about 25/75 average, particle size of rubber 0.4 μm).

Table 8 shows the result of AS resin (Sumitomo Chemical Co., Ltd., Kralastic K-1158).

Table 9 shows the result of a rubber-like material 0001 (AnSt-g-PBD, Sumitomo Chemical Co., Ltd., Kralastic S-3710).

Table 10 shows the result of ABS resin (Sumitomo Chemical Co., Ltd., Kralastic K-2540) in which the rubber-like material 0001 (AnSt-g-PB) is combined in AS resin (Sumitomo Chemical Co., Ltd., K-1158). Said ABS resin is the mother polymer in which the flame retarder and the flame retarding aid agent are added to be the final ABS resin.

Table 11 shows the result of AS resin to which rubber-like material 0004 AnSt-g-EPDM is combined (EPDM-AS (resin 0004)).

Said rubber-like material 0004 is St and An graft copolymerized EPDM containing about 75% by weight of ethylene and about 20% by weight of propylene, and about 5% by weight of DCP as the third component and St and An are graft copolymerized to said EPDM by the ordinary method (slurry polymerization) and the graft ratio is about 45% by weight, An/St weight ratio is about 2575, and about 50% by weight of EPDM is contained in said rubber-like material and the average particle size of rubber is about 1 $\mu$m. To prepare said EPDM-AS (resin 0004), said rubber-like material was pelletized by the extruder and then said pelletized rubber-like material is mixed in said AS resin pellet (Kialastic K-1158) in the weight ratio of 75/25 (AS/AnSt-g-EPDM) in the tumbler and the resulting mixture was pelletized by the extruder and the pelletizer.

Said EPDM-AS resin (resin 0004) was tested under the same condition and method as above described to evaluate thermal stability of resin. Referring to Tables 7, 8, 9, 10, and 11, the degradation of impact strength of ABS resin and AnSt-g-PBD combined in ABS resin by heating and melting was recognized while the degradation of impact strength of AS resin which is a component of ABS resin by heating and melting was not recognized.

Referring to Tables 11, 33 and 35, it is clear that the degradation by heating was not recognized about EPDM-AS resin (resin 0004) in which AnSt-g-EPDM (the third component is DCP) containing double bond(s) inside chain or AnSt-g-EPM and AnSt-g-ANM containing no double bond so that the inventor found that by using said rubber-like material as the recycle aid agent in recycling the resin mold containing thermoplastic resin as the main component, the degradation of impact strength can be recovered and improved and further since AnSt-g-EPDM (rubber-like polymer 0004), AnSt-g-EPM and AnSt-g-ANM have and excellent thermal stability, said rubber-like material as recycle aid agents do not lose rubber-like elasticity in repeated recycling so that the adding amount of said rubber-like material for each recycle can be reduced.

REFERENCE 4

In REFERENCE 4, whether the thermoplastic elastomer can be used as a recycle aid agent to recover impact strength of the resin mold or not was validated. Virgin ABS resin (UBE SYCONCO SYCOLAC ZFJ5 (94UL:HB)) was used as said thermoplastic resin and some kind of elastomers having compatibility with said ABS resin respectively were added to said virgin ABS-resin to improve impact strength in the various adding amount.

Initial impact strength of said ABS resin was determined and then each elastomer was added in said ABS resin and impact strength of each ABS resin in which each elastomer was added was determined. 5 kinds of said elastomers were used. Pelprene S2002, Pelprene P40H, Pelprene P70B, Pelprene P1SOB, and Peiprene P75M (Toyobo Co., Ltd.).

Each elastomer was added in said ABS resin respectively in the amount of 5% by weight or 10% by weight to prepare a test sample and Table 15 to Table 19 show the result of change of impact strength of each test sample.

Referring to Table 15 to Table 19, it is confirmed that each elastomer can improve impact strength of said ABS resin so that each elastomer can be a recycle aid agent for recycling of said thermoplastic resin of said resin mold to improve degraded impact strength by recycling.

EXAMPLE 1

ABS resin (styrac 191F Asahi Kasei Corporation.) containing AnSt-g-PBD as said rubber-like material was used. A molded test piece of said ABS resin was coated with paint 0001 of REFERENCE 1 and said test piece was shattered and pelletized. The rubber-like material 0001 (AnSt-g-PBD in which An and St were graft copomerized to PBD by emulsion polymerzation, graft ratio; about 40% by weight, An/St weight ratio; about 25/75, rubber content; about 50% by weight, average rubber particle size; about 0.4 $\mu$m) was used as said recycle aid agent. Since said rubber-like material was provided in a powder type from the maker, said rubber-like material was pelletized by using the same extruder of REFERENCE 1, mother polymer of ABS resin (Sumitomo Chemical Co., Ltd., Kralastic K-2540 containing said rubber-like material 0001) and said resin 0004 (rubber-like polymer and AnSt-g-EPDM (the third component was DCP)) were respectively added in said recycled and pelletized thermoplastic resin of said test piece to recover impact strength . The results are shown in Tables 12, 13 and 14.

Referring to said Tables 12, 13 and 14, it is confirmed that the degraded impact strength of ABS resin by recycling can be recovered by adding said rubber-like materials or said resin pellets containing said rubber-like materials in a large amount.

EXAMPLE 2

A thermoplastic elastomer (Toyobo Co., Ltd., PELPLENE P70B) which was confirmed that said thermoplastic elastomer can improve but has no effect on other physical properties such as tensile strength, bending strength, and the like referring to the results of said REFERENCE 4 was selected.

A test piece prepared by the injection molding of ABS resin (Asahi Kasei Corporation., Styrac 190, natural color) was coated with paint 0001 having compatibility with ABS resin (Formulations are shown in Table 3) and shattered and pelletized without separating the paint film to prepare recycled-resin material pellet.

Said thermoplastic elastomer (Toyobo Co., Ltd., PELPLENE P70B) was added to said recycled resin material pellets in the amount of 8% by weight or 10% by weight, and each sample was tested to check the recovery of degraded impact strength by recycling and changes of other physical properties (Table 20).

In said Table 20, the results of the tests of the virgin resin and the recycled resin (one turn) are also shown.

Referring to Table 20, no change of the thermal property of said ABS resin by adding said thermoplastic elastomer was recognized and the drop of the defection temperature also was not recognized.

A little degradation of the mechanical properties by adding said thermoplastic elastomer is recognized but said degradation does not effect substantially on their use as molding material.

The results of further analysis of the result of adding said thermoplastic elastomer are as follows.

In a case where said thermoplastic elastomer was used as a recycle aid agent to recover degraded impact strength by recycling, impact strength and elongation were improved and the good result about energy (strength x elongation: expressed as area of stress-strain curve) was attained. Especially IZOD impact strength at 25° C. was better than the virgin resin material.

Improvement or recovery of impact strength was attained by adding said thermoplastic elastomer while degradations of tensile strength and bending strength were recognized. To recover tensile strength and bending strength, the third component such as AS resin, inorganic material, and the like should be added and the results are shown in Table 21.

Referring to Table 20 and Table 21, adding AS resin is preferable to improve tensile strength and bending strength in a case where impact strength is recovered by adding said thermoplastic elastomer in ABS resin.

In the case of HIPS resin or modified PPE resin, degraded impact strength is also recovered by adding the thermoplastic elastomer or the rubber-like material having compatibility with these resins but in a case where the physical properties, such as bending strength were degraded, it is necessary to balance by adding PS resin or PPE resin (since HIPS and PPE have compatibility respectively, PPE can be used for HIPS and PS resin can also be used for modified PPE resin.

As above described, in a case where impact strength is tried to be recovered by adding the rubber-like material (AnSt-g-PB) having compatibility with said ABS resin not only said thermoplastic elastomer, degradation of strength was recognized in the same way as said elastomer so that the recovery of impact strength, tensile strength, bending strength, and the like can be recovered by adding AS resin together with said rubber-like material. In this case since adding AS resin conflicts with adding said thermoplastic elastomer or said rubber-like material, it is necessary to balance the adding amount of each component considering the purpose of the use.

To test whether said thermoplastic resin (ABS resin) of said resin mold has compatibility with said thermoplastic elastomer (Toyobo Co., Lid., Pelprene P70B) used to recover impact strength or not, TEM was applied.

Test method was as follows;

90 parts by weight of said ABS resin (Asahi Kasei Corporation., Styrac 190, natural color) and 10 parts by weight of said thermoplastic elastomer (Toyobo Co., Ltd., Pelprene P70B) were mixed and the resulting mixture was pelletized by using the single screw extruder.

The resulting pellets of the mixture (ABS resin/thermoplastic elastomer) were sliced by the microtome and peeling or breaking in the interface and the boundary resin were observed.

Figure 2:
FIG. 2 is a TEM photograph showing, a compatible state of said thermoplastic resin of said resin mold and said thermoplastic elastomer added to recover impact strength in Example 2.
Figure 3:
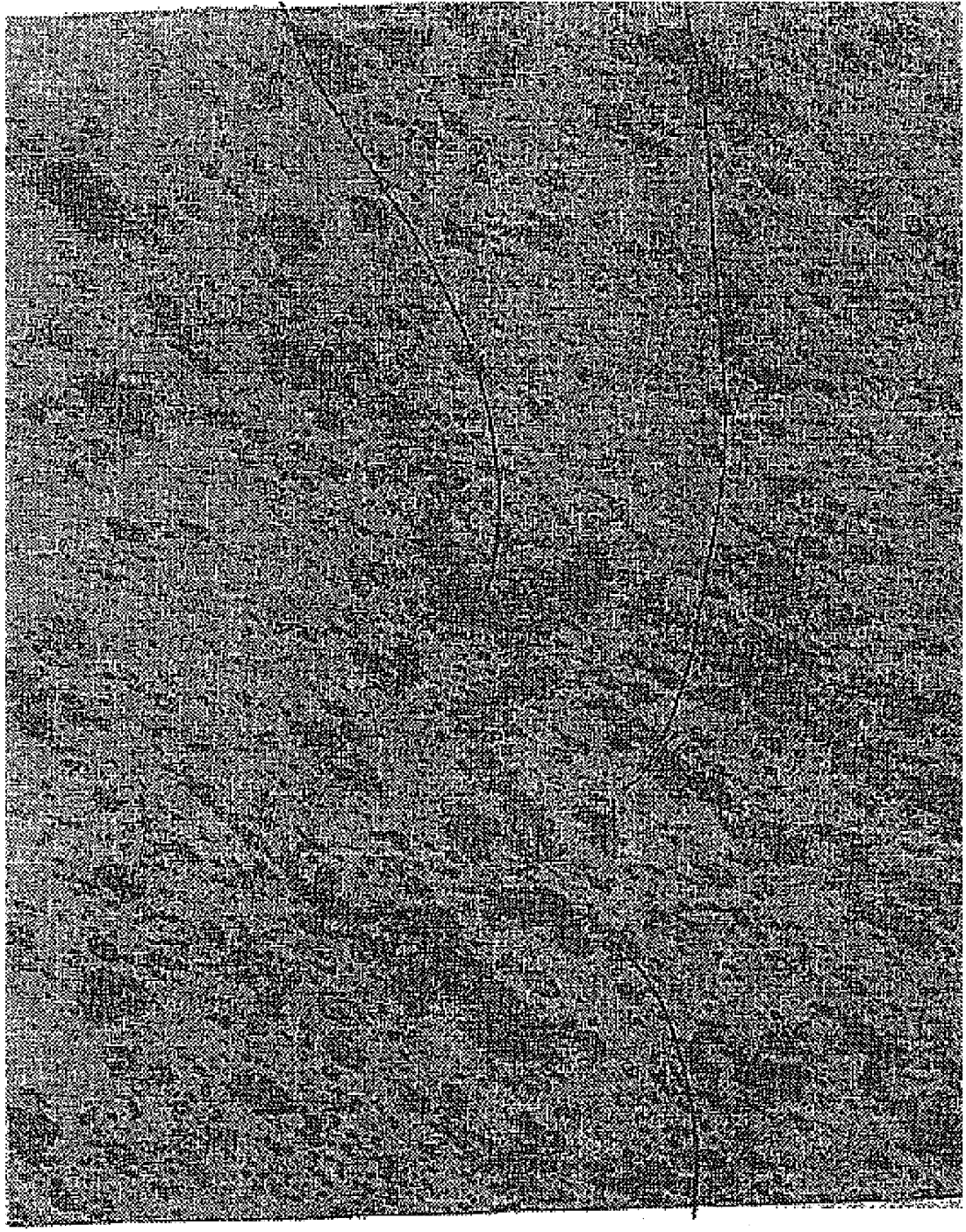
FIG. 3 is a TEM photograph showing a compatible state of said thermoplastic resin of said resin mold and said thermoplastic elastomer added to recover impact strength.
Figure 4:
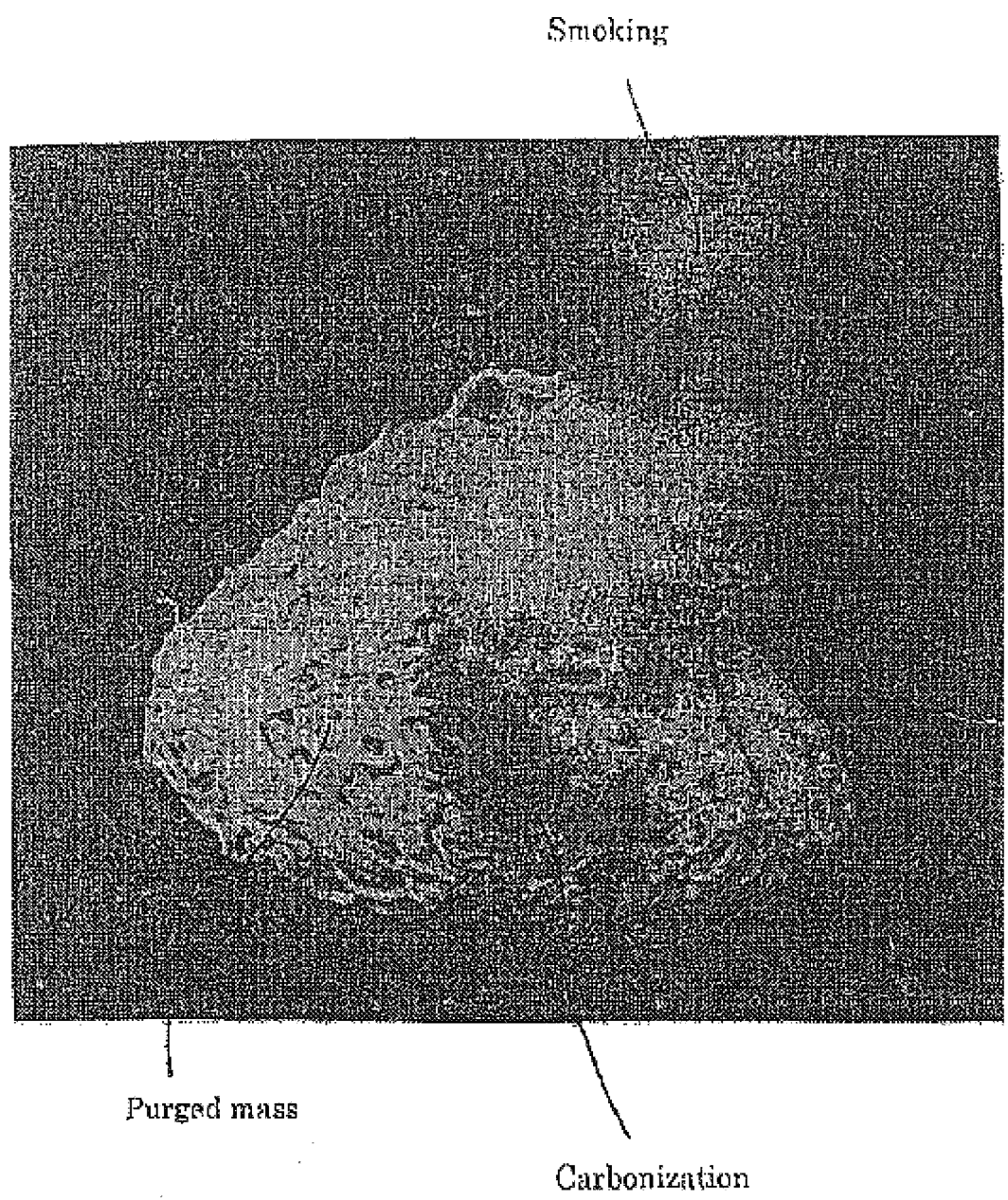
FIG. 4 is a photograph showing a situation where a purged mass of a non flammable ABS resin containing epoxy bromide smokes by the exothermic reaction.

The results were shown in FIG. 2 and FIG. 3 showing TEM photographs respectively and no peeling or breaking in the interface and the boundary resin was observed to judge that said ABS resin and said thermoplastic elastomer have enough compatibility respectively.

EXAMPLE 3

In EXAMPLE 3, the method for production of said recycled resin material and the properties of the paint film were estimated.

In EXAMPLE 1, AnSt-g-PB was blended in the shattered resin material to recover impact strength . In EXAMPLE 3,15% by weight of the recycle aid agent (rubber-like polymer 0001) was blended in said shattered resin material to pelletize by using said extruder and the pelletizer and a recycled resin material (1 turn recycle) in which said recycle aid agent was dispersed finely to recover the physical properties was prepared. Using said recycled resin material, a test piece was molded and said paint 0001 was coated on said test piece.

Referring to Table 22, there is no problem about paint property and no difference from the case in which the virgin resin pellets were used was recognized.

Impact strength of said recycled resin pellets was determined and the result is shown in Table 23. Comparing the case that the recycle aid agent (rubber-like polymer 0001) was blended in said shattered resin material, the degradation of impact strength (IZOD impact strength 18.8 kg-cm/cm to 16.7 kg-cm/cm, Table 12) was recognized. It seems that the cause of said degradation of impact strength is the heat degradations of the added recycle aid agent and AnSt-g-PB added initially in ABS resin by oxidation degradation in pelletizing.

To avoid said oxidation degradation, it seems to be desirable to introduce an inert gas such as nitrogen gas and the like into the extruder or the molding machine in the heating and melting stage and the molding stage to reduce oxigen content in the atmosphere.

Further when CO, $CO_2$ and the like or hydrocarbon gas such as methane, ethane, and the like are introduced in the super critical state into the cylinder of the extruder at a high pressure and dissolved in the melted resin to increase fluidity, moldability can be improved. In this case, it is necessary to apply the gas counter pressure method and the like to prevent surface foaming when the melted resin in which said gas is dissolved at a high pressure is injection molded.

EXAMPLE 4

In EXAMPLE 4, ABS resin having incombustibility (Asahi Kasei Corporation., styracVA58) was injection-molded. The resulting mold was coated with the paint 0001 containing styrene modified acrylic resin as the main component having compatibility with said thermoplastic resin of said resin mold. Said mold was shattered and pelletized without removing the paint film to prepare recycled resin pellets of ABS having incombustibility in which to paint film was contaminated (one turn recycle sample No. 2 in Table 24). The mold without coating was also shattered and pelletized (one turn recycle sample No. 3).

The properties (non flammability and mechanical properties) of each sample was respectively compared with the virgin sample (sample No.1 in Table 24). Referring to Table 24, both the sample with paint coating (sample No.2 in Table 24) and the sample without coating (sample No.3 in Table 24) show the degradations of both non flammability and impact strength comparing virgin resin mold (sample No. 1 in Table 24).

10 parts by weight of the thermoplastic elastomer (Toyobo Co., Ltd., Pelprene P70B) as a recovering agent of impact strength was added in 100 parts by weight of sample No. 2 showing the degradation of impact strength by one turn recycle to recover impact strength. Impact strength was recovered by adding said thermoplastic elastomer while non flammability was degraded by adding said thermoplastic elastomer. To give non flammability to said resin sample whose impact strength was recovered (sample No. 4 in Table 24), brominated epoxy (tetrabromobisphenol A-etrabromobisphenol A·diglycidyl ether copolymer Sakamoto Yakuhin Kogyo Co., Ltd., SR-T20000, number average molecular weight about 30000, weight average molecular weight about 70000, bromin content 52% by weight) was added.

Said brominated epoxy was provided in a powder form and pelletized by the same extruder and pelletizer as used in REFERENCE 1. The results were respectively shown in Table 24. In Table 24, sample No. 1 is the virgin resin material pellets of said non flammable ABS resin, sample No. 2 is the resin material pellets in which the paint film was contaminated, sample No. 3 is the resin material pellets in which no paint film was contaminated, sample No. 4 is the resin material pellets in which said thermoplastic elastomer (Pelprene P70B) was blended, sample No. 5 is the resin material pellets in which said brominated epoxy (SR-T20000) was blended in sample No. 4.

Referring to Table 24, the degradation of impact strength and non-flammability were recognized by recycling and when thermoplastic elastomer was added to recover impact strength, non-flammability was further degraded. To improve non-flammability together with impact strength, it is useful to add the flame-retardant together with the rubber-like material having elasticity and high impact strength such as the rubber-like polymer, thermoplastic elastomer, and the like.

In Table 24, only brominated epoxy was used to recover non flammability but non flammability was further improved by using antimony oxide together with said brominated epoxy. Since said brominated epoxy (halogenated epoxy) has an end part having high reactivility, when a chemical compound having active hydrogen such as an acid or alkali compound, an amine compound, acrylic acid produced by decomposition of styrene-modified acrylic resin as the main component of said paint film exist, said halogenated epoxy may react with them exothermically to give out smoke to be carbonized.

To solve this problem, the method modifying the end of said brominated epoxy with inactive radical, and the like is applied. The reason why said brominated epoxy is used as a flame retardant is that said brominated epoxy contains halogen to give non flammability to the resin and has higher durability than other organic bromide and said brominated epoxy is used for many kinds of styrene-group resin.

When the resin mold is coated with such as paint 0001 and the like, the resulting paint film maintains durability, it is not necessary to use said brominated epoxy and it is enough to use tetrabromobisphenol A (TBBA), decabromobenzen and the like.

REFERANCE 5

EDTM-PS resin (resin 0002) was prepared in this reference by mixing the rubber-like polymer 0002 (St-g-EPDM (third component is DCP the same as AnSt-g-EPDM) in which styrene is graft copolymerized to EPDM by the slurry polymerization method, average particle size 1.0 $\mu$m, rubber content about 38% by weight, styrene graft ratio about 35% by weight) and PS resin (A&M polystyrene CO., A&M polystyrene HF77) in an weight ratio 75/25 (PS/rubber-like polymer 0002) and the resulting EPDM-PS resin (resin 0002) was pelletized by using the same apparatus as REFERENCE 1.

REFERENCE 6

Styrene was further graft copolymerized to the rubber-like polymer 0002 by the same slurry polymerization as REFERENCE 5 to prepare the rubber-like polymer 0003, St-g-EPDM (third component is DCP), (average particle size 1.0 $\mu$m, rubber content about 38% by weight, styrene graft ratio about 55% by weight).

REFERENCE 7

Said resin 0002 and resin 0003 were heated and melted in the cylinder of the extruder the same as REFERENCE 3, and piled in the cylinder respectively to determine thermal stability. The results are shown in Table 25-1, 25-2. The rubber-like polymers 0002 and 0003 containing EPDM as the main component respectively have excellent thermal stability respectively the same as said rubber-like polymer 0004.

REFERENCE 8

50% by weight of mixed resin pellets which contain 25% by weight of the rubber-like polymer 0003 having excellent thermal stability, St-g-EPDM (styrene graft ratio 55% by weight, EPDM content 38% by weight the third component DCP) and 75% by weight of PS resin (A&M polystyrene HF77) and 50% by weight of PPE resin produced by oxidation coupling polymerization of 2.6 xyleuol under the existence of dibutylamine (this method is describede in U.S. Pat. No. 4,788,227) were mixed by the tumbler and the resulting mixture was pelletized by the same apparatus as used in REFERENCE 3 to prepare a modified PPE resin, EPDM-PS-PPE (resin 0005) modified with St-g-EPDM and PS resin.

REFERENCE 9

Said resin 0004, resin 0003 and resin 0004 were used and recycled by the same method and using said apparatus (mold, molding machine, extruder, pelletyzer, etc.) was repeated 3 turn and the results are shown in Table 26-1, 26-2, 26-3.

In REFERENCE 9, no degradation of impact strength was recognized in the case of the resin for mold in a case of the rubber-like polymer containing EPDM having good thermal stability as the main component. The improvement of impact strength was recognized in the case of resin 0003 since rubber-like polymer 0003 St-g-EPDM causes phase conversion to arrange St inside and EPDM outside. For phase conversion, temperature and pressure are effected and phase converted St-g-EPDM obtains compatibility by arranging St inside and EPDM outside. To proceed said phase conversion enough, temperature and pressure are repeatedly effected by using the extruder to prepare the rubber-like polymer St-g-EPDM having improved compatibility. AnSt-g-EPDM, AnSt-g-PBD, and St-g-PBD are also improved in their compatibility by the same method.

REFERENCE 10

Each resin mold of REFERENCE 9 was coated with paint 0001 with thickness 15 μm in each turn and said mold was shattered and pelletized with the paint film. Said procedure was repeated 3 turns. (IZOD impact strength in this case was shown in Table 27-1, 27-2, and 27-3).

Comparing the results of said Table 26-1, 26-2, and 26-3 (without paint coating), the degradation of impact strength was recognized respectively. The reason why impact strength degrades is that pigment and dyestuff were removed from the paint film and shifted to the resin in the heating and melting stage of recycle and contents of pigment and dyestuff which have poor compatibility with the resin increased in the resin.

EXAMPLE 5

The resin pellets in each turn in said REFERENCE 10 were sampled. The rubber-like polymer 0004 and 0003 were respectively added to said sampled resin pellets to recover impact strength and test pieces for IZOD impact strength were molded according to the method of ASTM-D468. The results are shown in Table 28-1, 28-2, and 28-3.

Referring to Table 28-1, 28-2, and 28-3, it is recognized that the degraded impact strength of each resin by contamination of the paint film can be recovered by adding the rubber-like polymer 0004 having compatibility with AS resin and 0003 having compatibility with PS resin and PPE group resin.

EXAMPLE 6

Impact strength of the resin 0005 of said REFERENCE 10 was recovered by adding the rubber-like polymer 0006 styren graft copolymerized PBD as a recycle aid agent in which rubber content was increased by emulsion polymerization (ST graft ratio about 60% by weight, rubber content about 50% by weight, average particle size 0.4 μm).

Impact strength can be recovered by using St-g-PBD containing PBD as the main component the same as the rubber-like polymer 0001 (Table 28-4).

Further moldability of modified PPE resin in which said rubber-like polymer 0003, St-g-PBD prepared by the bulk polymerization (St graft ratio about 40% by weight, rubber content 8 to 10% by weight, average particle size of rubber about 1 μm) which is used initially to give impact strength to virgin HIPS resin, modified PPE resin etc. was the same as the cases of XYRON 2202 and resin 0004 and no problem about mixing 2 kinds of rubbers was recognized.

EXAMPLE 7

In EXAMPLE 7, brominated epoxy resin, tetrabromobisphenol A-tetrabromobisphenol A·diglycidye ether copolymer (Sakamoto Yakuhin Kogyo Co., Ltd., SR-T20000, number average molecular weight about 30000, weight average molecular weight about 70000, bromine content 52% by weight) and antimony oxide were added to one turn recycled resin 0001 pellets of said EXAMPLE 5 as the flame retardant and the flame retarding aid agent.

Using said recycled resin pellets, the compositions shown in Table 29 1 to 6 were prepared by mixing in the tumbler and each composition was melted by the extruder and pelletized.

The resulting pellets were respectively molded to prepare test pieces for determination of non flammability and at the same time test pieces for determination of the IZOD impact strength were prepared by molding and whether impact strength degrades by adding the flame retardant or not was confirmed.

Referring to Table 29, it is confirmed that impact strength of EPDM-AS does not degrade by adding brominated epoxy and antimony oxide and non flammability can be given to EPDM-AS by adding said flame retardant and said flame retarding aid agent.

In EXAMPLE 7, the flame retardant and the flame retarding aid agent were mixed in said resin but another method wherein the master batch of pellets (SR-T20000 pellets and SR-T-20000 and antimony oxide mixture pellets) prepared by pelletizing said brominated epoxy (SR-T20000) and pelleting the mixture of said brominated epoxy (SR-T20000) and antimony oxide (mixing ratio is for instance 70/30 weight ratio) and mixing said pellets of said brominated epoxy (SR-T20000) and said pellets of said mixture of said brominated epoxy (SR-T20000) and antimony oxide are mixed in said resin pellets by such as the tumbler is also applicable to prepare said mixed resin pellets.

REFERENCE 11

A resin mold of a thermoplastic elastomer modified AS resin (TPE-AS) in which AS resin was modified with various thermoplastic elastomers (Du Pont-Toray Co., Polyester elastomer, Hytrel 4057, 5557, and 7247, and Pelprene P70B, P75M, P150B, P40H, S2002) was coated with paint 0001 and the results are shown in Table 30-1 and Table 30-2.

Each elastomer used in this example can recover degraded impact strength by recycling but the adhesiveness of paint film was degraded by said elastomers.

EXAMPLE 8

In EXAMPLE 8, it was found that the rubber-like polymer was useful to recover degraded impact strength by recycling and the flame retardant such as a halogenated compound such as brominated epoxy and antimony oxide can recover or give non flammability.

In EXAMPLE 8, it was confirmed that the adhesiveness of paint 0001 to the resin mold containing recycled resin material in which each recycle aid agent was enough (Table 31-1, Table 31-2) and coating property and paint film property have no problem and have efficient property.

EXAMPLE 9

In EXAMPLE 9, polystyrene foam was contracted and pelletized to prepare recycle polystyrene pellets. 25 parts by weight of said rubber-like polymer 0003 was mixed in 75 parts by weight of said recycle polystyrene pellets to prepare mixed resin pellets.

A test piece for IZOD impact strength was molded according to ASTM-D468 and IZOD impact strength of said test piece was determined. The resulting IZOD impact strength was 5.3 kg-cm/cm.

Said mixed resin pellets of said recycle polystyrene pellets and said rubber-like polymer 0003 (75/25 weight ratio) were pelletized by using the same apparatus and method as used in REFERENCE 1, HIPS resin (resin 0007) containing recycled polystyrene of polystyrene foam and the rubber-like polymer 0003 was prepared. IZOD impact strength of said HIPS resin (resin 0007) was 5.5 kg-cm/cm, substantially the same result as said mixed resin pellets.

EXAMPLE 9 relates to the recycle of polystyrene foam, moreover the degraded impact strength of a recycled complex resin material by recycling can be also recovered by adding the rubber-like material such as rubber-like material 0003, 0004, 0006 and the like wherein the complex mold consisting of modified PPE resin and polystyrene foam as a heat insulator or a sound proof panel or blow-molded of HIPS was shattered without separating to each material and pelletized to obtain said recycled complex resin material.

EXAMPLE 10

In EXAMPLE 9, recycle of polystyrene foam and the complex mold were described. In the case of the ABS resin mold on which the insulator is laminated such as an inner panel of a refrigerator, if said insulator is made of polyurethane foam, said insulator should be separated from said ABS resin mold when said ABS resin mold is recycled while if said insulator is made of AS resin foam having compatibility with said ABS resin, said ABS resin mold can be recycled without separating said insulator from said ABS resin mold. Nevertheless, AS resin contains no rubber-like polymer such as AnSt-g-PBD which is added to ABS resin, when said AS resin foam is recycled with said ABS resin. The physical properties such as impact strength may be degraded.

In this case, the rubber-like polymer such as AnSt-g-EPDM, AnSt-g-PBD and the like should be added to said recycled resin material to improve the physical properties.

50 parts by weight of ABS resin mold (styrac 191F) and 50 parts by weight of foamed AS resin (K-1158) using $N_2$ gas as a blowing agent (expansion ratio 2 times) were mixed together and the resulting mixture was pellctized by using the same apparatus as used in REFERENCE 1.

IZOD impact strength of the resulting recycled resin pellets was 9.2 kg-cm/cm. 5 parts by weight of the rubber-like material 0005 (pellet type) was added to said recycled resin pellets to improve the physical properties and IZOD impact strength was 17.5 kg-cm/cm.

EXAMPLE 11

An and St graft-copolymerized acrylic rubber (butylacryiate-butadiene copolymer), AnSt-g-ANM-P was blended in AS resin to prepare a blend polymer, ANM-B-AS/AS (Mitsubishi Rayon Co., Ltd., DIALAC S710A, natural color). Thermal stability of said rubber-like polymer was estimated by using the same method as used in REFERENCE 3. The result is shown in Table 33.

Since said rubber component of said rubber-like polymer was butylacrylate-butadiene copolymer, PB part was degraded by heating to lose rubber-like elasticity and the degradations of the physical properties were recognized but the thermostability of said rubber-like polymer was more excellent comparing with AnSt-g-PBD. It is presumed from the result of EXAMPLE 1 that saturated acrylic rubber has excellent thermal stability.

EXAMPLE 12

The thermal stability of the blend polymer of An and St graft copolymerized ethylene-propylene rubber (AnSt-g-EPM) and AS resin (Techno Polymer Co., Ltd., TECHNO ABS 160, EPM-AS, resin 0008) was estimated by using the same method as used in EXAMPLE 11 and the result was shown in Table 34. It was judged that said AnSt-g-EPM had excellent thermal stability the same as AnSt-g-ANM.

Said embodiments and examples were provided for the illustration of the invention and the invention is not limited to said embodiments and examples and the alterations, and the additions which can be recognized by those skilled in the art as pertains to the basis of the description of CLAIMS, DETAILED DESCRIPTION, AND DRAWINGS can be made as long as said alterations and said additions are not opposed to the spirit of the invention.

POSSIBILITY OF INDUSTRIAL APPLICATION

In the method for recycling the resin mold, a recycle aid agent having compatibility with the thermoplastic resin of said resin mold is used to improve impact strength, said recycle aid agent is rubber-like material having moldability. Further the flame retardant is used to give non flammability.

TABLE 1

Table on physical property change by recycling (painted resin mold).

|   |   | Evaluation items | Methods of measurement | Unit | Blank (Virgin material) | Recycling time(s) | | |
|---|---|---|---|---|---|---|---|---|
|   |   |   |   |   |   | 1 | 2 | 3 |
| 1. | Thermal property of material | Heat distortion temperature (18.6 kg weight) | ASTM-D648 | ° C. | 82.9 | 83.6 | 82.6 | 86.3 |
|   |   | Vicant softening temperature | ASTM-D1525 | ° C. | 106.4 | 106.2 | 106.6 | 107.3 |
|   |   | Melt flow rate | 250° C. 10 kg | g/10 min. | 24.9 | 26.3 | 27.3 | 27.3 |

TABLE 1-continued

Table on physical property change by recycling (painted resin mold).

| | Evaluation items | | Methods of measurement | Unit | Blank (Virgin material) | Recycling time(s) 1 | 2 | 3 |
|---|---|---|---|---|---|---|---|---|
| 2. | Mecanical property of Material | Tensile breaking strength | ASTM-D638 | % | 16 | 17 | 18 | 17 |
| | | Tensile yield point strength | ASTM-D638 | kg/cm$^2$ | 433 | 430 | 432 | 431 |
| | | Bending strength | ASTM-D790 | kg/cm$^2$ | 714 | 720 | 733 | 734 |
| | | Bending elasticity | ASTM-D790 | kg/cm$^2$ | 26400 | 26400 | 26700 | 25700 |
| | | Izod impact strength (23° C.) | ASTM-D256 | kg-cm/cm | 14.9 | 12.8 | 12.6 | 10.9 |
| 3. | Other property | Density | JIS K69115.2 | kg/cm$^3$ | 1.067 | 1.071 | 1.074 | 1.072 |

Notes
Molding resin, ABS resin (Styrac 191F), was purchased from ASAHI KASEI CORPORATION.
Its color is quartz white (C/A Spec. 99-0400).
Paint is "Paint 0001", the color of which is quartz white (C/A Spec. 99-0400).
The process consisting of injection molding, painting, shattering and pelletizing, was turned 3 times.

TABLE 2

Table on physical property change by recycling (painted resin mold).

| | Evaluation items | | Methods of measurement | Unit | Blank (Virgin material) | Recycling time(s) 1 | 2 | 3 |
|---|---|---|---|---|---|---|---|---|
| 1. | Thermal property of material | Heat distortion temperature (18.6 kg weight) | ASTM-D648 | ° C. | 82.9 | 84.4 | 84.4 | 86.6 |
| | | Vicant softening temperature | ASTM-D1525 | ° C. | 106.4 | 106.2 | 106.6 | 106.9 |
| | | Melt flow rate | 250° C. 10 kg | g/10 min. | 24.9 | 26.3 | 27 | 25.8 |
| 2. | Mecanical property of Material | Tensile breaking strength | ASTM-D638 | % | 16 | 19 | 18 | 19 |
| | | Tensile yield point strength | ASTM-D638 | kg/cm$^2$ | 433 | 432 | 431 | 427 |
| | | Bending strength | ASTM-D790 | kg/cm$^2$ | 714 | 710 | 725 | 730 |
| | | Bending elasticity | ASTM-D790 | kg/cm$^2$ | 26400 | 26400 | 26500 | 25200 |
| | | Izod impact strength (23° C.) | ASTM-D256 | kg-cm/cm | 14.9 | 13.9 | 13.1 | 11.4 |
| 3. | Other property | Density | JIS K69115.2 | kg/cm$^3$ | 1.067 | 1.068 | 1.069 | 1.069 |

Notes
Molding resin, ABS resin (Styrac 191F), was purchased from ASAHI KASEI CORPORATION.
Its color is quartz white (C/A Spec. 99-0400).
Paint is "Paint 0001", the color of which is quartz white (C/A Spec. 99-0400).
The process consisting of injection molding, painting, shattering and pelletizing, was turned 3 times.

TABLE 3

Paint #0001 Combination

| No. | Raw materials | Amount (wt %) |
|---|---|---|
| 1 | Styrene modified acrylic resin vanish | 31.1 |
| 2 | Titanium oxide | 10.8 |
| 3 | Extender pigment | 11.3 |
| 4 | Toluene | 16 |
| 5 | Xylene | 14 |
| 6 | Isopropyl alcohol | 6 |
| 7 | Isobutanol | 10.6 |
| 8 | Additive | 0.2 |

Notes
No. 1 styrene modified acrylic resin whose name is ACRYDIC A-157 was manufactured by DAINIPPON INK AND CHEMICALS, INCORPORATED. The resin which is used for painting exhibits compatibility with styrene resins such as ABS, HIPS, modified PPE and the like.

TABLE 4

Paint #0002 Combination

| No. | Raw materials | Amount (wt %) |
|---|---|---|
| 1 | Styrene modified acrylic resin vanish | 40 |
| 2 | Titanium oxide | 0 |
| 3 | Extender pigment | 0 |
| 4 | Toluene | 20.5 |
| 5 | Xylene | 18 |
| 6 | Isopropyl alcohol | 8 |
| 7 | Isobutanol | 13.3 |
| 8 | Additive | 0.2 |

Notes
No. 1 styrene modified acrylic resin whose name is ACRYDIC A-157 was manufactured by DAINIPPON INK AND CHEMICALS, INCORPORATED. The resin which is used for painting, exhibits compatibility with styrene resins such as ABS, HIPS, modified PPE and the like.

TABLE 6

Results of painting influence test

| No. | Method of preparing sample | Actual measurement value of Izod impact strength | Heat history (the number of times) | Painting (the number of times) |
|---|---|---|---|---|
| 1 | Virgin material → Molding test pieces | 21.2 | 1 time when in the case of molding sample | 0 |
| 2 | Virgin material → Shattering → Molding test pieces | 19.7 | 2 times when in the case of molding and preparing sample | 0 |
| 3 | Shattering paint #0001 painted virgin material product → Molding test pieces | 15.8 | 2 times when in the case of molding and preparing sample | 1 |
| 4 | Shattering paint #0002 painted virgin material product → Molding test pieces | 19.5 | 2 times when in the case of molding and preparing sample | 1 |
| 5 | Shattering paint #0003 painted virgin material product → Molding test pieces | 19.4 | 2 times when in the case of molding and preparing sample | 1 |

Notes)
1) Molding material: ABS resin, Styrac 191H manufactured by ASAHI KASEI CORPORATION.
2) Unit of Izod impact strength; kg-cm/cm
3) Dried paint film thickness = 15 μm in the case of No. 3 using paint #0003. Paint conditions such as paint viscosity and paint time and so on, on No. 4 using #0002 and No. 5 using #0003 were same as No. 3 using paint #0001.

TABLE 7

| No. | Method of forming sample[1] | Actual measurement value of Izod impact strength[2] | Heat history (the number of times) |
|---|---|---|---|
| 1 | Virgin material | 20.3 | 1 time when in the case of molding sample |
| 2 | Sample prepared by shattering the molded product molded of virgin material | 11.8 | 2 times when in the case of molding and preparing sample |
| 3 | Sample prepared by heating virgin material at 250° C., 0.5 hr. | 11.4 | 3 times when in the case of staying in the heated cylinder, molding and preparing sample |
| 4 | Sample prepared by heating virgin material at 250° C., 1 hr. | 9.2 | 3 times when in the case of staying in the heated cylinder, molding and preparing sample |

Notes)
[1]Virgin material; ABS resin Kralastic MVF-IKI purchased from Sumitomo Chemical ABS LATEX Co., Ltd.
[2]Unit of Izod impact strength; kg-cm/cm

TABLE 8

| No. | Method of forming sample[1] | Actual measurement value of Izod impact strength[2] | Heat history (the number of times) |
|---|---|---|---|
| 1 | Virgin material | 11.4 | 1 time when in the case of molding sample |
| 2 | Sample prepared by shattering the molded product molded of virgin material | 9.9 | 2 times when in the case of molding and preparing sample |
| 3 | Sample prepared by heating virgin material at 250° C., 0.5 hr. | 8.8 | 3 times when in the case of staying in the heated cylinder, molding and preparing sample |
| 4 | Sample prepared by heating virgin material at 250° C., 1 hr. | 11.3 | 3 times when in the case of staying in the heated cylinder, molding and preparing sample |

Notes)
[1]Virgin material; ABS resin K-1158 purchased from Sumitomo Chemical ABS LATEX Co., Ltd.
[2]Unit of Izod impact strength; kg-cm/cm
[3]No notch

TABLE 9

| No. | Method of manufacturing of sample[1] | Actual measurement value of Izod impact strength[2] | Heat history (the number of times) |
|---|---|---|---|
| 1 | Virgin material | 29.6 | 1 time when in the case of molding sample |
| 2 | Sample prepared by shattering the molded product molded of virgin | 26.9 | 2 times when in the case of molding and preparing sample |
| 3 | Sample prepared by heating virgin material at 250° C., 0.5 hr. | 23.3 | 3 times when in the case of staying in the heated cylinder, molding and preparing sample |

TABLE 9-continued

| No. | Method of manufacturing of sample[1] | Actual measurement value of Izod impact strength[2] | Heat history (the number of times) |
|---|---|---|---|
| 4 | Sample prepared by heating virgin material at 250° C., 1 hr. | 24.4 | 3 times when in the case of staying in the heated cylinder, molding and preparing sample |

Notes)
[1]Virgin material; Rubber (AS-g-PBR) added to ABS resin purchased from Sumitomo Chemical ABS LATEX Co., Ltd. Kralastic S3710 (rubber-like polymer 0001)
[2]Unit of Izod impact strength; kg-cm/cm

TABLE 10

| No. | Method of manufacturing of sample[1] | Actual measurement value of Izod impact strength[2] | Heat history (the number of times) |
|---|---|---|---|
| 1 | Virgin material | 21.2 | 1 time when in the case of molding sample |
| 2 | Sample prepared by shattering the molded product molded of virgin material | 19.55 | 2 times when in the case of molding and preparing sample |
| 3 | Sample prepared by heating virgin material at 250° C., 0.5 hr. | 12.9 | 3 times when in the case of staying in the heated cylinder, molding and preparing sample |
| 4 | Sample prepared by heating virgin material at 250° C., 1 hr. | 9.8 | 3 times when in the case of staying in the heated cylinder, molding and preparing sample |

Notes)
[1]Virgin material; Mother polymer of ABS resin, K-2540 purchased from Sumitomo Chemical ABS LATEX Co., Ltd.
[2]Unit of Izod impact strength; kg-cm/cm

TABLE 11

| No. | Method of manufacturing of sample[1] | Actual measurement value of Izod impact strength[2] | Heat history (the number of times) |
|---|---|---|---|
| 1 | Virgin material | 39 | 1 time when in the case of molding sample |
| 2 | Sample prepared by shattering the molded product molded of virgin | 38.2 | 2 times when in the case of molding and preparing sample |
| 3 | Sample prepared by heating virgin material at 250° C., 0.5 hr. | 40.8 | 3 times when in the case of staying in the heated cylinder, molding and preparing sample |
| 4 | Sample prepared by heating virgin material at 250° C., 1 hr. | 39.6 | 3 times when in the case of staying in the heated cylinder, molding and preparing sample |

Notes)
[1]Virgin material; resin 0004
[2]Unit of Izod impact strength; kg-cm/cm

TABLE 12

| Added amount = ABS resin/rubber-like polymer (0001)[1] | Izod impact strength[2] |
|---|---|
| 100/0 | 11.3 |
| 95/5 | 14 |
| 90/10 | 16 |
| 85/15 | 18.8 |
| 80/20 | 20.4 |
| 75/25 | 22.9 |

Notes
[1]Rubber-like polymer 0001 used as recycle aid agent.
[2]Unit of Izod impact strength is kg-cm/cm.

TABLE 13

| Added amount = ABS resin/rubber-like polymer (mother polymer)[1] | Izod impact strength[2] |
|---|---|
| 100/0 | 11.3 |
| 95/5 | 12.7 |
| 90/10 | 13.8 |
| 85/15 | 14.4 |
| 80/20 | 15 |

Notes
[1]Recycle aid agent containing rubber-like polymer 0001(Sumitomo Chemical Co., Ltd. ABS Latex used.
[2]Unit of Izod impact strength is kg-cm/cm.

TABLE 14

| Added amount = ABS resin/rubber-like polymer (0004)[1] | Izod impact strength[2] |
|---|---|
| 100/0 | 11.3 |
| 95/5 | 13.1 |
| 90/10 | 13.6 |
| 85/15 | 13.8 |
| 80/20 | n.d. |

Notes
[1]Rubber-like polymer 0004 used as recycle aid agent
[2]Unit of Izod impact strength is kg-cm/cm.

TABLE 15

Thermoplastic elastomer; Pelprene S2002

| | Evaluation items | | Method of measurement | Unit | Virgin material | 5 wt % | 10 wt % | 20 wt % |
|---|---|---|---|---|---|---|---|---|
| 1. | Thermal property | 1) | Deflection temperature under load (18.6 kg weight) ASTM-D648 | ° C. | 80 | 79 | 79 | 78 |
| 2. | Mechanical properties | 2) | Breaking point elongation ASTM-D638 | % | 2.9 | 2.7 | 2.6 | 3.4 |
| | | 3) | Tensile breaking point strength ASTM-D638 | kg/cm$^2$ | 356 | 365 | 361 | 321 |
| | | 4) | Tensile yield point strength ASTM-D638 | kg/cm$^2$ | 398 | 382 | 380 | 368 |
| | | 5) | Tensile elasticity ASTM-D638 | kg/cm$^2$ | 21400 | 20400 | 20200 | 17200 |
| | | 6) | Bending yield point strength ASTM-D790 | kg/cm$^2$ | 643 | 582 | 569 | 528 |
| | | 7) | Bending elasticity ASTM-D790 | kg/cm$^2$ | 22500 | 18500 | 18200 | 14600 |
| | | 8) | Izod impact strength (23° C.) ASTM-D256 | kg-cm/cm | 27 | 26.7 | 29.6 | 25.8 |
| | | 9) | Izod impact strength (0° C.) ASTM-D256 | kg-cm/cm | 32.1 | 35.7 | 39.3 | 46.7 |

TABLE 16

Thermoplastic elastomer; Pelprene P40H

| | Evaluation items | | Method of measurement | Unit | Virgin material | 5 wt % | 10 wt % | 20 wt % | 30 wt % |
|---|---|---|---|---|---|---|---|---|---|
| 1. | Thermal property | 1) | Deflection temperature under load (18.6 kg weight) ASTM-D648 | ° C. | 80 | 80 | 80 | 80 | 80 |
| 2. | Mechanical properties | 2) | Breaking point elongation ASTM-D638 | % | 2.9 | 3.2 | 3.7 | 6.9 | 21.1 |
| | | 3) | Tensile breaking point strength ASTM-D638 | kg/cm$^2$ | 356 | 334 | 319 | 247 | 222 |
| | | 4) | Tensile yield point strength ASTM-D638 | kg/cm$^2$ | 398 | 374 | 374 | 306 | 239 |
| | | 5) | Tensile elasticity ASTM-D638 | kg/cm$^2$ | 21400 | 20300 | 19100 | 16000 | 12000 |
| | | 6) | Bending yield point strength ASTM-D790 | kg/cm$^2$ | 643 | 593 | 578 | 520 | 431 |
| | | 7) | Bending elasticity ASTM-D790 | kg/cm$^2$ | 22500 | 20500 | 19900 | 17600 | 14400 |
| | | 8) | Izod impact strength (23° C.) ASTM-D256 | kg-cm/cm | 27 | 38.8 | 41.4 | 44.6 | 35.8 |
| | | 9) | Izod impact strength (0° C.) ASTM-D256 | kg-cm/cm | 32.1 | 29 | 30.9 | 35.2 | 33.9 |

TABLE 17

Thermoplastic elastomer; Pelprene P70B

| | Evaluation items | | Method of measurement | Unit | Virgin material | 5 wt % | 10 wt % | 20 wt % | 30 wt % |
|---|---|---|---|---|---|---|---|---|---|
| 1. | Thermal property | 1) | Deflection temperature under load (18.6 kg weight) ASTM-D648 | ° C. | 80 | 80 | 80 | 80 | 80 |
| 2. | Mechanical properties | 2) | Breaking point elongation ASTM-D638 | % | 2.9 | 3.2 | 3.8 | 5.8 | 33.8 |
| | | 3) | Tensile breaking point strength ASTM-D638 | kg/cm$^2$ | 356 | 359 | 353 | 304 | 264 |
| | | 4) | Tensile yield point strength ASTM-D638 | kg/cm$^2$ | 398 | 406 | 393 | 347 | 302 |
| | | 5) | Tensile elasticity ASTM-D638 | kg/cm$^2$ | 21400 | 20100 | 19800 | 16600 | 14100 |
| | | 6) | Bending yield point strength ASTM-D790 | kg/cm$^2$ | 643 | 626 | 602 | 550 | 505 |
| | | 7) | Bending elasticity ASTM-D790 | kg/cm$^2$ | 22500 | 21100 | 20200 | 18100 | 16300 |
| | | 8) | Izod impact strength (23° C.) ASTM-D256 | kg-cm/cm | 27 | 41.1 | 46.1 | 54.2 | 53.6 |
| | | 9) | Izod impact strength (0° C.) ASTM-D256 | kg-cm/cm | 32.1 | 29.7 | 31.6 | 38.9 | 38 |

TABLE 18

Thermoplastic elastomer; Pelprene P150B

| | Evaluation items | | Method of measurement | Unit | Virgin material | 5 wt % | 10 wt % | 20 wt % | 30 wt % |
|---|---|---|---|---|---|---|---|---|---|
| 1. | Thermal property | 1) | Deflection temperature under load (18.6 kg weight) ASTM-D648 | ° C. | 80 | 83 | 82 | 82 | 82 |
| 2. | Mechanical properties | 2) | Breaking point elongation ASTM-D638 | % | 2.9 | 4.5 | 3.4 | 3.8 | 5 |
| | | 3) | Tensile breaking point strength ASTM-D638 | kg/cm$^2$ | 356 | 268 | 182 | 173 | 162 |
| | | 4) | Tensile yield point strength ASTM-D638 | kg/cm$^2$ | 398 | 268 | 198 | 198 | 185 |
| | | 5) | Tensile elasticity ASTM-D638 | kg/cm$^2$ | 21400 | 16100 | 10800 | 9900 | 9000 |
| | | 6) | Bending yield point strength ASTM-D790 | kg/cm$^2$ | 643 | 623 | 610 | 584 | 543 |
| | | 7) | Bending elasticity ASTM-D790 | kg/cm$^2$ | 22500 | 21700 | 19900 | 18900 | 17300 |
| | | 8) | Izod impact strength (23° C.) ASTM-D256 | kg-cm/cm | 27 | 35.8 | 29.7 | 19.8 | 15.6 |
| | | 9) | Izod impact strength (0° C.) ASTM-D256 | kg-cm/cm | 32.1 | 20.2 | 17.1 | 16.5 | 15.8 |

TABLE 19

Thermoplastic elastomer; Pelprene P75M

| | Evaluation items | | Method of measurement | Unit | Virgin material | 5 wt % | 10 wt % | 20 wt % | 30 wt % |
|---|---|---|---|---|---|---|---|---|---|
| 1. | Thermal property | 1) Deflection temperature under load (18.6 kg weight) | ASTM-D648 | ° C. | 80 | 79 | 79 | 78 | 76 |
| 2. | Mechanical properties | 2) Breaking point elongation | ASTM-D638 | % | 2.9 | 4.4 | 3.8 | 5.7 | 94 |
| | | 3) Tensile breaking point strength | ASTM-D638 | kg/cm$^2$ | 356 | 343 | 343 | 304 | 257 |
| | | 4) Tensile yield point strength | ASTM-D638 | kg/cm$^2$ | 398 | 410 | 400 | 355 | 279 |
| | | 5) Tensile elasticity | ASTM-D638 | kg/cm$^2$ | 21400 | 20500 | 20100 | 18100 | 14000 |
| | | 6) Bending yield point strength | ASTM-D790 | kg/cm$^2$ | 643 | 620 | 599 | 537 | 468 |
| | | 7) Bending elasticity | ASTM-D790 | kg/cm$^2$ | 22500 | 21600 | 20300 | 17800 | 15100 |
| | | 8) Izod impact strength (23° C.) | ASTM-D256 | kg-cm/cm | 27 | 39.8 | 49.5 | 52 | 54 |
| | | 9) Izod impact strength (0° C.) | ASTM-D256 | kg-cm/cm | 32.1 | 28.7 | 35.5 | 40.2 | 40.1 |

TABLE 20

| | Evaluation items | | Method of measurement | Unit | Virgin material | Recycled material turned 1 time | Added Pelprene P70B 8% | Added Pelprene P70B 10% |
|---|---|---|---|---|---|---|---|---|
| 1. | Thermal property | 1) Deflection temperature under load (18.6 kg weight) | ASTM-D648 | ° C. | 82 | 84 | 82 | 83 |
| 2. | Mechanical properties | 2) Breaking point elongation | ASTM-D638 | % | 4.5 | 5.9 | 5.6 | 5.4 |
| | | 3) Tensile breaking point strength | ASTM-D638 | kg/cm$^2$ | 193 | 190 | 179 | 173 |
| | | 4) Tensile yield point strength | ASTM-D638 | kg/cm$^2$ | 201 | 188 | 172 | 169 |
| | | 5) Tensile elasticity | ASTM-D638 | kg/cm$^2$ | 22400 | 23100 | 20800 | 19900 |
| | | 6) Bending yield point strength | ASTM-D790 | kg/cm$^2$ | 721 | 745 | 731 | 650 |
| | | 7) Bending elasticity | ASTM-D790 | kg/cm$^2$ | 24600 | 25700 | 22800 | 21900 |
| | | 8) Izod impact strength (23° C.) | ASTM-D256 | kg-cm/cm | 14.5 | 10.6 | 18.3 | 20.3 |
| | | 9) Izod impact strength (0° C.) | ASTM-D256 | kg-cm/cm | 10.2 | 7.9 | 9.2 | 10.3 |

TABLE 21

| Additives (Recycle aid agent) | Strengths (Bending, Tensile yield point) | Impact strength | Elongation | Heat resistance | Moldability | Surface condition |
|---|---|---|---|---|---|---|
| GF (glass fiber) | ↑↑ | ↓ | ↓ | ↑↑ | → | ↓↓ |
| Inorganic filler | ↑ | ↓ | ↓ | ↑ | → | ↓ |
| AS resin | ↗ | ↘ | → | → | → | → |

TABLE 22

| | | | | | Paint 0001 | |
|---|---|---|---|---|---|---|
| | Items | | Test items | Test | Unit | Virgin material | 1 cycle |
| 1. | Painting suitability | 1) | Appearance | Based on JIS K540O 7.1 | | Good | Good |
| 2. | Paint film qualities | 1) | Dried paint film thickness | Permascope | μm | Over 15 | Over 15 |
| | | 2) | Pencil hardness | Based on JIS K540O 8.4.2 | | Over H | Over H |
| | | 3) | 90° cross cut test | Based on JIS K540O 5.2 | | 100/100 | 100/100 |
| | | 4) | Inclined 30° cross cut test | Based on JIS K540O 5.3 | | 100/100 | 100/100 |
| | | 5) | 30° Cross cut test | Based on JIS K540O 5.3 | mm | Under 1 mm | Under 1 mm |
| | | 6) | Moisture vapor resistance | Based on JIS K540O 8.9.1 (98% RT × 40° C. × 24 hr.) | mm | Paint film; no trouble Adhesion; 100/100 Peeling width; under 1 mm | Paint film; no trouble Adhesion; 100/100 Peeling width; under 1 mm |

TABLE 22-continued

|  |  |  |  | Paint 0001 | |
| --- | --- | --- | --- | --- | --- |
| Items | Test items | Test | Unit | Virgin material | 1 cycle |
| | 7) Moisture resistance test | Based on JIS K540O 8.9.1 (40° C. × 24 hr.) | mm | Paint film; no trouble Adhesion; 100/100 Peeling width; under 1 mm | Paint film; no trouble Adhesion; 100/100 Peeling width; under 1 mm |

TABLE 23

| Additive amount = ABS resin/rubber-like polymer 0001 | IZOD impact strength |
| --- | --- |
| 100/0 | 11.3 |
| 85/15 | 16.7 |

Notes)
1) Rubber-like polymer 0001 was used as recycle aid agent.
2) Unit of Izod impact strength is kg-cm/cm.

TABLE 24

| | Items | Sample 1 | Sample 2 | Sample 3 | Sample 4 | Sample 5 |
| --- | --- | --- | --- | --- | --- | --- |
| Materials | ABS resin (Virgin material) | 100 | — | — | — | — |
| | ABS resin (Recycle material) | — | 100 | — | 100 | 100 |
| | ABS resin (Recycle material) | — | — | 100 | — | — |
| Additives | Impact strength recovery agent (thermoplastic resin) | — | — | — | 10 | 10 |
| | Flame retardant (Brominated epoxy compound) | — | — | — | — | 3 |
| Burning test (1/16") | Afterflame time (sec.) | 1–2 | 1–9 | 1–13 | 5–26 | 1–13 |
| | Total afterflame time (sec.) | 14 | 37 | 54 | 111 | 37 |
| | Afterglow time (sec.) | 2–18 | 16–33 | 20–44 | 0–45 | 1–26 |
| | Average afterglow time (sec.) | 9.4 | 22.8 | 34.6 | 24.4 | 14.8 |
| | Dropping ratio | 0/5 | 0/5 | 0/5 | 2/5 | 0/5 |
| | Cotton ignition ratio | 0/5 | 0/5 | 0/5 | 2/5 | 0/5 |
| | Total evaluation | V-0 | V-1 | V-1 | V-2 | V-1 |
| Burning Test (1/32") | Afterflame time (sec.) | 1–6 | 1–6 | 1–4 | 0–14 | 2–13 |
| | Total afterflame time (sec.) | 28 | 30 | 20 | 57 | 51 |
| | Afterglow time (sec.) | 0–3 | 1–32 | 6–27 | 0 | 0–17 |
| | Average afterglow time (sec.) | ta 0.6 | 10 | 16.6 | 0 | 4.2 |
| | Dropping ratio | 0/5 | 0/5 | 0/5 | 5/5 | 2/5 |
| | Cotton ignition ratio | 0/5 | 0/5 | 0/5 | 5/5 | 1/5 |
| | Total evaluation | V-0 | V-1 | V-0 | V-2 | V-2 |
| Mechanical properties of material | Tensile strength (kg/cm$^2$) | 363 | 365 | 367 | 345 | 354 |
| | Yield elongation (%) | 2.4 | 2.4 | 2.5 | 2.9 | 2.9 |
| | Elongation at break (%) | 11.4 | 11.5 | 8.3 | 10.9 | 10.6 |
| | Izod impact strength (kg-cm/cm) | 11.3 | 10.2 | 11.6 | 12.4 | 11.9 |

Notes)
1. Method of preparing of test piece
1) Resin dry time: 3 hr. (80° C.), 2) Resin temperature in case of molding: 220° C. 3) Preparation of test pieces condition; keeping the test pieces under the condition such as 50% humidity, 23° C.
2. Tests
1) Burning test; based on flammability standard UL-94, 2) Tensile test; based on JIS K 7113, 3) Bending strength; based on JIS K 7203, 4) Impact test; based on JIS K 7110

TABLE 25-1

Resin 0002

| Sample | Izod impact strength |
|---|---|
| Virgin material | 5.8 |
| Purge product | 5.9 |
| 0.5 hr. Heat melting stay product | n.d. |
| 1 hr. Heat melting stay product | 5.8 |

Note
Unit: kg-cm/cm
Method of measurement of Izod impact strength; ASTM-D256

TABLE 25-2

Resin 0003

| Sample | Izod impact strength |
|---|---|
| Virgin material | 9.6 |
| Purge product | 9.9 |
| 0.5 hr. Heat melting stay product | n.d. |
| 1 hr. Heat melting stay product | 9.6 |

Note
Unit: kg-cm/cm
Method of measurement of Izod impact strength; ASTM-D256

TABLE 26-1

EPDM-PS (Resin 0004)/no painted

| | Evalution items | | Method of measuremen | Unit | Virgin material | 1 turn | 2 turn | 3 turn |
|---|---|---|---|---|---|---|---|---|
| 1. | Heat properties | 1) | Deflection temperature under load (18.6 kg weight) | ASTM-D468 | °C. | 86.1 | 86.2 | 86.7 | 87.7 |
| 2. | Mechanical properties | 1) | Breaking point temperature | ASTM-D638 | kg/cm$^2$ | 489.6 | 492.2 | 493.5 | 469.4 |
| | | 2) | Tensile breaking point elongation | ASTM-D638 | % | 16.6 | 15.3 | 15.4 | 14.8 |
| | | 3) | Bending yield point strength | ASTM-D790 | kg/cm$^2$ | 760.6 | 767.7 | 765.3 | 765.2 |
| | | 4) | Bending elasticity | ASTM-D790 | kg/cm$^2$ | 27600 | 27600 | 27500 | 27800 |
| | | 5) | Izod impact strength | ASTM-D256 | kg-cm/cm | 18.8 | 18.8 | 18.7 | 18.9 |
| 3. | Others | 1) | Light fastness | FOM 120 hr. irradiation | Color difference (ΔE) | 0.3 | 0.3 | 0.4 | 0.3 |

TABLE 26-2

EPDM-PS (Resin 0003)/no painted

| Evaulation items | | Method of measuremen | Unit | Virgin material | 1 turn | 2 turn | 3 turn |
|---|---|---|---|---|---|---|---|
| 1. Heat properties | 1) Deflection temperature under load (18.6 kg weight) | ASTM-D468 | °C. | 85.0 | 85.6 | 85.9 | 85.5 |
| 2. Mechanical properties | 1) Breaking point temperature | ASTM-D638 | kg/cm$^2$ | 222.5 | 229.2 | 239 | 242.9 |
| | 2) Tensile breaking point elongation | ASTM-D638 | % | 72.1 | 39.6 | 47.2 | 47.3 |
| | 3) Bending yield point strength | ASTM-D790 | kg/cm$^2$ | 340.5 | 339.5 | 338.6 | 342.2 |
| | 4) Bending elasticity | ASTM-D790 | kg/cm$^2$ | 20399 | 20760 | 20861 | 20907 |
| | 5) Izod impact strength | ASTM-D256 | kg-cm/cm | 6.20 | 6.40 | 6.45 | 6.90 |
| 3. Others | 1) Light fastness | FOM 120 hr. irradiation | Color difference (ΔE) | 0.4 | 0.3 | 0.3 | 0.3 |

TABLE 26-3

EPDM-PS-PPE (Resin 0005)/no painted

| Evaulation items | | Method of measuremen | Unit | Virgin material | 1 turn | 2 turn | 3 turn |
|---|---|---|---|---|---|---|---|
| 1. Heat properties | 1) Deflection temperature under load (18.6 kg weight) | ASTM-D468 | °C. | 87.7 | 89.6 | 90.4 | 89.7 |

TABLE 26-3-continued

EPDM-PS-PPE (Resin 0005)/no painted

| Evaluation items | | Method of measuremen | Unit | Virgin material | 1 turn | 2 turn | 3 turn |
|---|---|---|---|---|---|---|---|
| 2. Mechanical properties | 1) Breaking point temperature | ASTM-D638 | kg/cm$^2$ | 35 | 34.4 | 41.2 | 35.7 |
| | 2) Tensile breaking point elongation | ASTM-D638 | % | 468 | 473 | 479 | 508 |
| | 3) Bending yield point strength | ASTM-D790 | kg/cm$^2$ | 755 | 778 | 788 | 787 |
| | 4) Bending elasticity | ASTM-D790 | kg/cm$^2$ | 22200 | 22600 | 22900 | 22600 |
| | 5) Izod impact strength | ASTM-D256 | kg-cm/cm | 11.1 | 11.1 | 10.8 | 10.9 |

TABLE 27-1

EPDM-AS (Resin 0004)/Painted by (Paint 0001 15 μm)

| Evaluation items | | Method of measurement | Unit | Virgin material | 1 turn | 2 turn | 3 turn |
|---|---|---|---|---|---|---|---|
| 2. Mechanical properties | 5) Izod impact strength (23° C.) | ASTM-D256 | kg-cm/cm | 18.8 | 17.4 | 16.0 | 15.1 |

TABLE 27-2

EPDM-PS (Resin 0003)/Painted by (Paint 0001 15 μm)

| Evaluation items | | Method of measurement | Unit | Virgin material | 1 turn | 2 turn | 3 turn |
|---|---|---|---|---|---|---|---|
| 2. Mechanical properties | 5) Izod impact strength (23° C.) | ASTM-D256 | kg-cm/cm | 6.5 | 6.3 | 6.1 | 5.8 |

TABLE 27-3

EPDM-PS-PPE (Resin 0005)/Painted by (Paint 0001 15 μm)

| Evaluation items | | Method of measurement | Unit | Virgin material | 1 turn | 2 turn | 3 turn |
|---|---|---|---|---|---|---|---|
| 2. Mechanical properties | 5) Izod impact strength (23° C.) | ASTM-D256 | kg-cm/cm | 13.3 | 12.7 | 12.0 | 11.9 |

TABLE 28-1

EPDM-AS (Resin 0001)/AnSt-g-EPDM (Rubber-like polymer 0005)

| Additive amount of recycle aid agent (Rubber-like polymer 0001) (wt %) | Virgin material | 1 turn | 2 turn | 3 turn |
|---|---|---|---|---|
| No added | 18.8 | 17.4 | 16.0 | 15.1 |
| 1 wt % | — | 18.4 | 17.0 | 15.5 |
| 3 wt % | — | 20.3 | 19.0 | 17.7 |
| 5 wt % | — | 21.6 | 20.9 | 18.7 |
| 7 wt % | — | n.d. | 21.5 | 19.8 |
| 9 wt % | — | n.d. | n.d. | 20.8 |

TABLE 28-2

EPDM-PS (Resin 0002)/St-g-EPDM (Rubber-like polymer 0003)

| Additive amount of recycle aid agent (Rubber-like polymer 0001) (wt %) | Virgin material | 1 turn | 2 turn | 3 turn |
|---|---|---|---|---|
| No added | 6.5 | 6.3 | 6.1 | 5.8 |
| 1 wt % | — | 6.9 | 6.2 | 6.3. |
| 3 wt % | — | 7.3 | 7.2 | 7.1 |
| 5 wt % | — | 7.7 | 7.5 | 7.7 |
| 7 wt % | — | 8.2 | n.d. | 7.9 |
| 9 wt % | — | 8.9 | n.d. | 8.7 |

TABLE 28-3

EPDM-PS-PPE (Resin 0004)/St-g-EPDM (Rubber-like polymer 0003)

| Additive amount of recycle aid agent (Rubber-like polymer 0001) (wt %) | Virgin material | 1 turn | 2 turn | 3 turn |
|---|---|---|---|---|
| No added | 13.3 | 12.7 | 12.0 | 11.9 |
| 1 wt % | — | 12.9 | 12.5 | 12.2 |
| 3 wt % | — | 14.5 | 14.3 | 12.4 |
| 5 wt % | — | 16.8 | 15.7 | 14.2 |
| 7 wt % | — | 17.6 | 18.0 | 16.5 |
| 9 wt % | — | 20.1 | 19.7 | 17.7 |

TABLE 28-4

EPDM-PS-PPE (Resin 0004)/St-g-PBD (Rubber-like polymer 0006)

| Additive amount of recycle aid agent (Rubber-like polymer 0001) (wt %) | Virgin material | 1 turn | 2 turn | 3 turn |
|---|---|---|---|---|
| No added | 13.3 | 12.7 | 12.0 | 11.9 |
| 1 wt % | — | 15.7 | n.d. | 14.2 |
| 3 wt % | — | 24.7 | 23.9 | 19.9 |
| 5 wt % | — | n.d. | n.d. | 26.7 |
| 7 wt % | — | n.d. | n.d. | 31.4 |
| 9 wt % | — | n.d. | n.d. | 31.3 |

TABLE 29

| | Items | Virgin material | Blank | Combination 1 | Combination 2 | Combination 3 | Combination 4 | Combination 5 | Combination 6 |
|---|---|---|---|---|---|---|---|---|---|
| Combination ratio (wt %) | EPDM-AS | 100 | 100 | 100 | 100 | 100 | 100 | 100 | 100 |
| | Bromine epoxy resin | 0 | 0 | 20 | 25 | 28 | 30 | 33 | 36 |
| | Antimony trioxide | 0 | 0 | 5 | 6 | 7 | 8 | 8 | 9 |
| | Bromine content by amount | 0 | 0 | 8.4 | 10.0 | 10.9 | 11.4 | 12.3 | 13.0 |
| Burning time (1/16") | The first afterflame time (sec.) | — | — | 30~58 | 18~33 | 3~30 | 3~18 | <1 | ≦1 |
| | The second afterflame time (sec.) | — | — | 0~10 | 0~13 | 1~9 | 1~3 | ≦1 | 1~3 |
| | Total afterflame time (sec.) | — | — | 223 | 140 | 117 | 73 | ≦5 | 10 |
| | Afterglow time (sec.) | — | — | 7~20 | 14~77 | 22~49 | 0~41 | 0~12 | 0~17 |
| | Dropping ratio | — | — | 5/5 | 0/5 | 0/5 | 0/5 | 0/5 | 0/5 |
| | Cotton ignition ratio | — | — | 5/5 | 0/5 | 0/5 | 0/5 | 0/5 | 0/5 |
| | Total evaluation | Combustibility | Combustibility | HB | HB (≈ V-1) | V-1 | V-1 | V-0 | V-0 |
| Burning time (1/32") | The first afterflame time (sec.) | — | — | 18~46 | >1~55 | 1~26 | 1~9 | ≦1 | ≦1 |
| | The second afterflame time (sec.) | — | — | | >0~53 | 2~23 | 2~19 | 1~2 | 1~2 |
| | Total afterflame time (sec.) | — | — | >248 | >187 | 124 | 64 | 10 | 11 |
| | Afterglow time (sec.) | — | — | >18~28 | 3~34 | 14~25 | 7~29 | 6~29 | 7~30 |
| | Dropping ratio | — | — | 5/5 | 3/5 | 2/5 | 0/5 | 0/5 | 0/5 |
| | Cotton ignition ratio | — | — | 5/5 | 2/5 | 1/5 | 0/5 | 0/5 | 0/5 |
| | Total evaluation | Combustibility | Combustibility | HB | HB | V-2 | V-1 | V-0 | V-0 |
| Izod impact strength (Unit: kg-cm/cm) | | 18.8 | 18.8 | 16.7 | 18.3 | 17.2 | 17.8 | 17.8 | 17.8 |

TABLE 30-1

| Evaluation items | Tests and condition thereof | | Standard judgment | Hytrel 4057 | Hytrel 5557 | Hytrel 7247 |
|---|---|---|---|---|---|---|
| Adhesion | Cross cut-cellophane tape test | Cross cut-cellophane tape test (1 mm × 1 mm, 100 pieces) | 100/100 | 100/100 | 100/100 | 100/100 |
| | Cross cut test | Cross cut-cellophane tape test | Peeling width under 1 mm | 5 | 5 | 5 |
| Moisture resistance | 40° C., 90% in RH, 120 hr. | Appearance | Existence of blister | Blister partially | Blister partially | Blister partially |
| | | Cross cut-cellophane tape test (1 mm × 1 mm, 100 pieces) | 100/100 | 50/100 | 50/100 | 50/100 |

TABLE 30-1-continued

| Evaluation items | Tests and condition thereof | | Standard judgment | Hytrel | | |
|---|---|---|---|---|---|---|
| | | | | 4057 | 5557 | 7247 |
| | | Cross cut test | Peeling width under 1 mm | 2 | 2 | 3 |
| Hot waterproof | Dipping (40° C., 120 hr.) | Appearance | Existence of blister 100/100 | Blister partially 95/100 | Blister partially 95/100 | Blister partially 100/100 |
| | | Cross cut-cellophane tape test (1 mm × 1 mm, 100 pieces) | | | | |
| | | Cross cut test | Peeling width under 1 mm | 2 | 3 | 4 |

TABLE 30-2

| Evaluation items | Tests and condition thereof | | Standard of judgment | Pelprene | | | | |
|---|---|---|---|---|---|---|---|---|
| | | | | P70B | P75M | P150B | P40H | S2002 |
| Adhesion | Cross cut-cellophane tape test | Cross cut-cellophane tape test (1 mm × 1 mm, 100 pieces) | 100/100 | 100/100 | 100/100 | 100/100 | 100/100 | 100/100 |
| | Cross cut test | Cross cut-cellophane tape test | Peeling width under 1 mm | 5 | 5 | 5 | 5 | 5 |
| Moisture resistance | 40° C., 90% in RH, 120 hr. | Appearance | Existence of blister 100/100 | Blister partially 50/100 | Blister partially 50/100 | Blister partially 50/100 | Blister partially 50/100 | Blister partially 50/100 |
| | | Cross cut-cellophane tape test (1 mm × 1 mm, 100 pieces) | | | | | | |
| | | Cross cut test | Peeling width under 1 mm | 2 | 2 | 3 | 2 | 2 |
| Hot waterproof | Diping (40° C., 120 hr.) | Appearance | Existence of blister 100/100 | Blister partially 90/100 | Blister partially 95/100 | Blister partially 100/100 | Blister partially 90/100 | Blister partially 90/100 |
| | | Cross cut-cellophane tape test (1 mm × 1 mm, 100 pieces) | | | | | | |
| | | Cross cut test | Peeling width under 1 mm | 2 | 3 | 4 | 3 | 3 |

Notes
Evaluation standard of cross cut test; 5 = No peeling, 4 = A few peelings, 3 = Some peelings, 2 = Many peelings, 1 = All peeled

TABLE 31-1

| Evaluation items | Tests and condition thereof | | Standard judgment | Recycle material; ABS resin (Styrac 191H) | | | Recycle material; HIPS resin (Stylone 492) | | |
|---|---|---|---|---|---|---|---|---|---|
| | | | | As recycle aid agent, 5 wt % by weight rubber-like polymer 0001 was added. | As recycle aid agent, 5 wt % by weight rubber-like polymer 0005 was added. | As recycle aid agent, 10 wt % by weight SR-T20000 and 3 wt % by weight antimony oxide was added. | As recycle aid agent, 5 wt % by weight rubber-like polymer 0002 was added. | As recycle aid agent, 5 wt % by weight rubber-like polymer 0006 was added. | As recycle aid agent, 10 wt % by weight SR-T20000 and 3 wt % by weight antimony oxide was added. |
| Adhesion | Cross cut-cellophane tape test | Cross cut-cellophane tape test (1 mm × 1 mm, 100 pieces) | 100/100 | 100/100 | 100/100 | 100/100 | 100/100 | 100/100 | 100/100 |
| | Cross cut test | Cross cut-cellophane tape test | Peeling width under 1 mm | Under 1 mm | Under 1 mm | Under 1 mm | Under 1 mm | Under 1 mm | Under 1 mm |
| Moisture resistance | 40° C., 120 hr. in 90% RH | Appearance | Existence of blister 100/100 | No existence 100/100 | No existence 100/100 | No existence 100/100 | No existence 100/100 | No existence 100/100 | No existence 100/100 |
| | | Cross cut-cellophane | | | | | | | |

TABLE 31-1-continued

| Evaluation items | Tests and condition thereof | | Standard judgment | Recycle material; ABS resin (Styrac 191H) | | | Recycle material; HIPS resin (Stylone 492) | | |
|---|---|---|---|---|---|---|---|---|---|
| | | | | As recycle aid agent, 5 wt % by weight rubber-like polymer 0001 was added. | As recycle aid agent, 5 wt % by weight rubber-like polymer 0005 was added. | As recycle aid agent, 10 wt % by weight SR-T20000 and 3 wt % by weight antimony oxide was added. | As recycle aid agent, 5 wt % by weight rubber-like polymer 0002 was added. | As recycle aid agent, 5 wt % by weight rubber-like polymer 0006 was added. | As recycle aid agent, 10 wt % by weight SR-T20000 and 3 wt % by weight antimony oxide was added. |
| | | tape test (1 mm × 1 mm, 100 pieces) | | | | | | | |
| | | Cross cut test | Peeling width under 1 mm | Under 1 mm | Under 1 mm | Under 1 mm | Under 1 mm | Under 1 mm | Under 1 mm |
| Hot waterproof | Dipping (40° C., 120 hr.) | Appearance | Existence of blister | No existence | No existence | No existence | No existence | No existence | No existence |
| | | Cross cut-cellophane tape test (1 mm × 1 mm, 100 pieces) | 100/100 | 100/100 | 100/100 | 100/100 | 100/100 | 100/100 | 100/100 |
| | | Cross cut test | Peeling width under 1 mm | Under 1 mm | Under 1 mm | Under 1 mm | Under 1 mm | Under 1 mm | Under 1 mm |

TABLE 31-2

| Evaluation items | Tests and condition thereof | | Standard judgment | Recycle material; ABS resin (Styrac 191H) | | | Recycle material; HIPS resin (Stylone 492) | | |
|---|---|---|---|---|---|---|---|---|---|
| | | | | As recycle agent, 5% by weight rubber-like polymer 0002 was added. | As recycle agent, 5% by weight rubber-like polymer 0006 was added. | As recycle aid agent, 10 wt % by weight SR-T20000 and 3 wt % by weight antimony oxide was added. | As recycle aid agent, 5 wt % by weight rubber-like polymer 0002 was added. | As recycle aid agent, 5 wt % by weight rubber-like polymer 0006 was added. | As recycle aid agent, 10 wt % by weight SR-T20000 and 3 wt % by weight antimony oxide was added. |
| Adhesion | Cross cut-cellophane tape test | Cross cut-cellophane tape test (1 mm × 1 mm, 100 pieces) | 100/100 | 100/100 | 100/100 | 100/100 | 100/100 | 100/100 | 100/100 |
| | Cross cut test | Cross cut-cellophane tape test | Peeling width under 1 mm | Under 1 mm | Under 1 mm | Under 1 mm | Under 1 mm | Under 1 mm | Under 1 mm |
| Moisture resistance | 40° C., 120 hr. in 90% RH | Appearance | Existence of blister | No existence | No existence | No existence | No existence | No existence | No existence |
| | | Cross cut-cellophane tape test (1 mm × 1 mm, 100 pieces) | 100/100 | 100/100 | 100/100 | 100/100 | 100/100 | 100/100 | 100/100 |
| | | Cross cut test | Peeling width under 1 mm | Under 1 mm | Under 1 mm | Under 1 mm | Under 1 mm | Under 1 mm | Under 1 mm |
| Hot waterproof | Dipping (40° C., 120 hr.) | Appearance | Existence of blister | No existence | No existence | No existence | No existence | No existence | No existence |
| | | Cross cut-cellophane tape test (1 mm × 1 mm, 100 pieces) | 100/100 | 100/100 | 100/100 | 100/100 | 100/100 | 100/100 | 100/100 |
| | | Cross cut test | Peeling width under 1 mm | Under 1 mm | Under 1 mm | Under 1 mm | Under 1 mm | Under 1 mm | Under 1 mm |

TABLE 32

| ANM-AS(S710A) | IZOD impact strength |
| --- | --- |
| Virgin material | 29.5 |
| Purged product | 28.2 |
| 0.5 hr. Heat melting stay product | 23.7 |
| 1 hr. Heat melting stay product | 22.7 |

Notes)
Unit; kg-cm/cm
Method of measurement of IZOD impact strength; ASTM-D256

TABLE 33

| Resin 0008 | IZOD impact strength |
| --- | --- |
| Virgin material | 41.5 |
| Purged product | 40.5 |
| 0.5 hr. Heat melting stay product | n.d. |
| 1 hr. Heat melting stay product | 36.5 |

Notes)
Unit; kg-cm/cm
Method of measurement of IZOD impact strength; ASTM-D256

What is claimed is:

1. A method for recycling a styrenic resin mold comprising adding an elastomer having compatibility with said styrenic resin mold as a recycle aid agent when discarded stryenic resin mold is recycled by heating and melting.

* * * * *